(12) United States Patent
Greenberg et al.

(10) Patent No.: US 9,497,039 B2
(45) Date of Patent: Nov. 15, 2016

(54) AGILE DATA CENTER NETWORK ARCHITECTURE

(75) Inventors: Albert Greenberg, Redmond, WA (US); Parantap Lahiri, Redmond, WA (US); David A. Maltz, Redmond, WA (US); Parveen K. Patel, Redmond, WA (US); Sudipta Sengupta, Redmond, WA (US); Navendu Jain, Redmond, WA (US); Changhoon Kim, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 12/578,608

(22) Filed: Oct. 14, 2009

(65) Prior Publication Data
US 2010/0306408 A1 Dec. 2, 2010

Related U.S. Application Data

(60) Provisional application No. 61/182,063, filed on May 28, 2009.

(51) Int. Cl.
| | | |
|---|---|---|
| *G06F 15/173* | (2006.01) | |
| *H04L 12/46* | (2006.01) | |
| *H04L 29/12* | (2006.01) | |
| *H04L 12/761* | (2013.01) | |
| *H04L 12/931* | (2013.01) | |

(52) U.S. Cl.
CPC ..... *H04L 12/4633* (2013.01); *H04L 29/12028* (2013.01); *H04L 29/12047* (2013.01); *H04L 45/16* (2013.01); *H04L 49/356* (2013.01); *H04L 61/103* (2013.01); *H04L 61/15* (2013.01)

(58) Field of Classification Search
None
See application file for complete search history.

(56) References Cited

U.S. PATENT DOCUMENTS

| | | | |
|---|---|---|---|
| 4,013,999 A | 3/1977 | Erwin et al. | |
| 6,697,365 B1 | 2/2004 | Messenger | |
| 6,766,371 B1 | 7/2004 | Hipp et al. | |
| 6,795,655 B1 | 9/2004 | Sidorovich et al. | |
| 6,801,949 B1 | 10/2004 | Bruck et al. | |
| 6,907,395 B1 | 6/2005 | Hunt et al. | |
| 6,961,315 B1 | 11/2005 | Amster et al. | |
| 6,977,416 B2 | 12/2005 | Nakazawa et al. | |
| 6,999,462 B1 | 2/2006 | Acharya | |
| 7,031,304 B1 | 4/2006 | Arberg et al. | |
| 7,092,410 B2 | 8/2006 | Bordonaro et al. | |
| 7,127,508 B2 | 10/2006 | Edmision et al. | |

(Continued)

FOREIGN PATENT DOCUMENTS

| | | |
|---|---|---|
| CN | 1481176 A | 3/2004 |
| CN | 1802837 A | 7/2006 |

(Continued)

OTHER PUBLICATIONS

"Switch". Downloaded from http://searchtelecom.techtarget.com/definition/switch. Published Oct. 2000.*

(Continued)

*Primary Examiner* — Scott B Christensen
(74) *Attorney, Agent, or Firm* — Henry Gabryjelski; Kate Drakos; Micky Minhas

(57) ABSTRACT

This patent application relates to an agile network architecture that can be employed in data centers, among others. One implementation provides a virtual layer-2 network connecting machines of a layer-3 infrastructure.

22 Claims, 10 Drawing Sheets

(56) References Cited

U.S. PATENT DOCUMENTS

| | | |
|---|---|---|
| 7,177,271 B2 | 2/2007 | Shao et al. |
| 7,272,613 B2 | 9/2007 | Sim et al. |
| 7,296,268 B2 | 11/2007 | Darling et al. |
| 7,333,482 B2 | 2/2008 | Johansson et al. |
| 7,382,782 B1 | 6/2008 | Ferguson et al. |
| 7,457,868 B1 | 11/2008 | Guo |
| 7,487,541 B2 | 2/2009 | Robert |
| 7,512,702 B1 | 3/2009 | Srivastava et al. |
| 7,571,470 B2 | 8/2009 | Arregoces et al. |
| 7,590,727 B1 | 9/2009 | Barnes |
| 7,613,155 B2 | 11/2009 | Shim |
| 7,613,822 B2 | 11/2009 | Joy |
| 7,626,938 B1 | 12/2009 | Orr et al. |
| 7,698,460 B2 | 4/2010 | Zhang et al. |
| 7,710,867 B1 | 5/2010 | Masters |
| 7,898,970 B2 | 3/2011 | Klinker |
| 7,961,637 B2 | 6/2011 | McBeath |
| 8,005,011 B2 | 8/2011 | Yang |
| 8,125,985 B1 | 2/2012 | Aybay et al. |
| 8,130,661 B2 | 3/2012 | Kannan et al. |
| 8,160,063 B2 | 4/2012 | Maltz et al. |
| 8,248,928 B1 | 8/2012 | Wang et al. |
| 8,427,958 B2 | 4/2013 | Ko et al. |
| 8,539,094 B1 | 9/2013 | Marr |
| 8,547,855 B1 | 10/2013 | Zingale et al. |
| 8,634,297 B2 | 1/2014 | Mishra et al. |
| 8,675,502 B2 | 3/2014 | Blair |
| 8,942,237 B2 | 1/2015 | Benny et al. |
| 8,958,327 B2 | 2/2015 | Watve et al. |
| 2001/0055274 A1 | 12/2001 | Hegge et al. |
| 2002/0032871 A1 | 3/2002 | Malan et al. |
| 2002/0034162 A1 | 3/2002 | Brinkerhoff et al. |
| 2002/0141479 A1 | 10/2002 | Garcia-Luna-Aceves et al. |
| 2002/0184368 A1 | 12/2002 | Wang |
| 2002/0184383 A1 | 12/2002 | Song |
| 2003/0009559 A1 | 1/2003 | Ikeda |
| 2003/0046388 A1 | 3/2003 | Milliken |
| 2003/0076846 A1 | 4/2003 | Heinz et al. |
| 2003/0154236 A1 | 8/2003 | Dar et al. |
| 2003/0195919 A1 | 10/2003 | Watanuki et al. |
| 2003/0204634 A1* | 10/2003 | Pinkerton et al. ............ 709/250 |
| 2004/0236547 A1 | 11/2004 | Rappaport et al. |
| 2004/0267920 A1 | 12/2004 | Hydrie et al. |
| 2005/0003828 A1 | 1/2005 | Sugar et al. |
| 2005/0027862 A1 | 2/2005 | Nguyen et al. |
| 2005/0050272 A1* | 3/2005 | Behrens et al. ............ 711/114 |
| 2005/0278415 A1 | 12/2005 | Corbea et al. |
| 2006/0002370 A1 | 1/2006 | Rabie et al. |
| 2006/0245406 A1 | 11/2006 | Shim |
| 2006/0271655 A1 | 11/2006 | Yoon et al. |
| 2007/0002770 A1 | 1/2007 | Haalen et al. |
| 2007/0033645 A1* | 2/2007 | Jones .............................. 726/12 |
| 2007/0147339 A1 | 6/2007 | Forissier et al. |
| 2007/0189191 A1 | 8/2007 | Ades |
| 2007/0245352 A1 | 10/2007 | Ma |
| 2007/0250608 A1 | 10/2007 | Watt |
| 2007/0280124 A1 | 12/2007 | Bivens et al. |
| 2007/0280243 A1* | 12/2007 | Wray et al. .................... 370/392 |
| 2008/0080390 A1 | 4/2008 | Ebuchi et al. |
| 2008/0080552 A1 | 4/2008 | Gates et al. |
| 2008/0130616 A1 | 6/2008 | Wengerter et al. |
| 2008/0225474 A1 | 9/2008 | Flynn et al. |
| 2008/0239983 A1 | 10/2008 | Bivens et al. |
| 2008/0275975 A1 | 11/2008 | Pandey et al. |
| 2008/0310422 A1 | 12/2008 | Booth et al. |
| 2009/0063706 A1 | 3/2009 | Goldman et al. |
| 2009/0106529 A1* | 4/2009 | Abts et al. ...................... 712/28 |
| 2009/0129384 A1 | 5/2009 | Regan |
| 2009/0154766 A1 | 6/2009 | Quine et al. |
| 2009/0196620 A1 | 8/2009 | Ozeki et al. |
| 2009/0201293 A1 | 8/2009 | Tung et al. |
| 2009/0235097 A1 | 9/2009 | Hamilton et al. |
| 2010/0036903 A1 | 2/2010 | Ahmad et al. |
| 2010/0061240 A1 | 3/2010 | Sindhu et al. |
| 2010/0246482 A1 | 9/2010 | Erceg et al. |
| 2010/0302940 A1 | 12/2010 | Patel et al. |
| 2011/0087799 A1 | 4/2011 | Padhye et al. |
| 2011/0150489 A1 | 6/2011 | Davidson et al. |
| 2011/0185091 A1 | 7/2011 | Rofougaran et al. |
| 2011/0243074 A1 | 10/2011 | Shin et al. |
| 2012/0084419 A1 | 4/2012 | Kannan et al. |
| 2012/0250682 A1 | 10/2012 | Vincent et al. |
| 2013/0047151 A1 | 2/2013 | Sridharan et al. |
| 2013/0159487 A1 | 6/2013 | Patel et al. |
| 2013/0163426 A1 | 6/2013 | Beliveau et al. |
| 2013/0191829 A1 | 7/2013 | Shimokawa et al. |
| 2014/0369227 A1 | 12/2014 | Salonidis et al. |
| 2014/0369347 A1 | 12/2014 | Orsley |
| 2015/0063353 A1 | 3/2015 | Kapadia et al. |
| 2015/0124831 A1 | 5/2015 | Kumar et al. |

FOREIGN PATENT DOCUMENTS

| | | |
|---|---|---|
| CN | 1875603 A | 12/2006 |
| CN | 101553054 A | 10/2009 |
| EP | 1107475 A2 | 6/2001 |
| EP | 1233551 A2 | 8/2002 |
| EP | 1494422 A2 | 1/2005 |
| JP | 2000232483 A | 8/2002 |
| JP | 2004228828 A | 8/2004 |
| JP | 2005-0257756 | 1/2005 |
| JP | 2005-130512 | 5/2005 |
| JP | 2005-260594 | 9/2005 |
| JP | 2006074171 A | 3/2006 |
| JP | 2006174399 A | 6/2006 |
| JP | 2007235827 A | 9/2007 |
| JP | 2007-312434 | 11/2007 |
| JP | 2008042669 A | 2/2008 |
| JP | 2008-199348 | 8/2008 |
| JP | 2009-80642 | 4/2009 |
| KR | 10-2005-0002608 | 1/2005 |
| KR | 2007-0023697 A | 2/2007 |
| WO | 9930460 A2 | 6/1999 |
| WO | 03087887 A2 | 10/2003 |
| WO | 2010/138937 A2 | 12/2010 |
| WO | 2013040942 A1 | 3/2013 |

OTHER PUBLICATIONS

Farinacci et al. "Locator/ID Separation Protocol (LISP)", Internet Engineering Task Force, IETF. Internet Society. Geneva, Switzerland. May 26, 2009.*

"International Search Report", Mailed Date: Jan. 3, 2011, Application No. PCT/US2010/036758, Filed Date: May 28, 2010, pp. 12.

Cho, et al., "An Efficient Location and Routing Scheme for Mobile Computing Environments", IEEE Journal on Selected Areas in Communications, vol. 13, No. 5, Jun. 1995, pp. 1-11.

Gordon, et al., "Hypercube Message Routing in the Presence of Faults", SIGARCH Third Conference on Hypercube Concurrent Computers and Applications, Jan. 19-20, 1988, pp. 318-327.

Vetter, et al., "An Experimental Study of Insider Attacks for OSPF Routing Protocol", Retrieved at << http://www.ieee-icnp.org/1997/papers/1997-31.pdf >>, Proceedings International Conference on Network Protocols, Oct. 28-31, 1997, pp. 293-300.

Kallahalla, et al. "SoftUDC: A Software-Based Data Center for Utility Computing", Retrieved at <<http://ieeexplore.ieee.org/stamp/stamp.jsp?tp=&arnumber=1362586&isnumber=29851>>, Nov. 2004, vol. 37, Issue 11, pp. 38-46.

Chase, et al. "Balance of Power: Energy Management for Server Clusters", Retrieved at <<http://reference.kfupm.edu.sa/content/b/a/balance_of_power_energy_management_for_741068.pdf>> 2001, pp. 6.

Arregoces, et al. "Data Center Design Overview", Retrieved at << http://techrepublic.com.com/i/tr/downloads/home/1587050234_chapter_4.pdf>> Dec. 4, 2003, Issue 1, Cisco Press, pp. 116-157.

Al-Fares, et al. "A Scalable, Commodity Data Center Network Architecture", Retrieved at <<http://ccr.sigcomm.org/online/files/p63-alfares.pdf>>, Oct. 2008, vol. 38, Issue 4, ACM New York, NY, USA, pp. 63-74.

(56) References Cited

OTHER PUBLICATIONS

Chang, et al. "Load Balanced Birkhoff-Von Neumann Switches", Retrieved at <<http://ieeexplore.ieee.org/stamp/stamp.jsp?tp=&isnumber=&arnumber=923646>> 2001, pp. 276-280.
"Cisco—Data Center Ethernet", Retrieved at <<http://www.cisco.com/en/US/netsol/ns783/index.html>> May 25, 2009, pp. 1-2.
"Cisco: Data center: Load balancing data center services, 2004", Retrieved at <<https://cisco.hosted.jivesoftware.com/servlet/JiveServlet/previewBody/3438-102-1-9467/cdccont_0900aecd800eb95a.pdf%3Bjsessionid=D15FC693EE8863EC7D2158BB98FFEAF8>> Mar. 2004, pp. 94.
Kimberly, et al. "A Parameterizable Methodology for Internet Traffic Flow Profiling", Retrieved at << http://citeseerx.ist.psu.edu/viewdoc/download;jsessionid=84D5AA3D26226253B7F72B7F41E0EA69?doi=10.1.1.47.979&rep=rep1&type=pdf>> pp. 1-25.
Duffield, et al. "A Flexible Model for Resource Management in Virtual Private Network", Retrieved at <<http://citeseerx.ist.psu.edu/viewdoc/download?doi=10.1.1.44.9104&rep=rep1&type=pdf>> 1999, pp. 14.
Meyer, et al. "Locator/ID Separation Protocol (LISP)", Retrieved at <<http://www.ieff.org/proceedings/07mar/slides/RRG-0.pdf>>, Mar. 17, 2007, pp. 1-21.
Greenberg, et al. "Towards a Next Generation Data Center Architecture: Scalability and Commoditization", Retrieved at <<http://conferences.sigcomm.org/sigcomm/2008/workshops/presto/papers/p57.pdf>> Aug. 2008, Seattle, USA, pp. 57-62.
Guo, et al. "DCell: A Scalable and Fault-Tolerant Network Structure for Data Centers", Retrieved at <<http://research.microsoft.com/en-us/people/chguo/dcell.pdf>> Aug. 17-22, 2008, Seattle, USA, pp. 12.
Hamilton, James. "An Architecture for Modular Data Centers", Retrieved at <<http://arxiv.org/ftp/cs/papers/0612/0612110.pdf>> Dec. 21, 2006, pp. 8.
Hamilton, James, "Cooperative Expendable Micro-Slice Servers (CEMS): Low Cost, Low Power Servers for Internet-Scale Services", In Conf. on Innovative Data Systems Research, Jan. 2009. Retrieved at <<http://www.mvdirona.com/jrh/talksandpapers/jameshamilton_cems.pdf>> Jan. 2009, pp. 8.
Handley, et. al., "TCP Friendly Rate Control (TFRC): Protocol Specification", Retrieved at <<http://www.ietf.org/rfc/rfc3448.txt>> Jan. 2003, p. 1-23.
Kim, et al. "Floodless in SEATTLE: A Scalable Ethernet Architecture for Large Enterprises", Retrieved at <<http://www.cs.princeton.edu/~chkim/Research/SEATTLE/seattle.pdf>> Aug. 17-22, 2008, Seattle, USA, pp. 1-14.
Kodialam, et al. "Efficient and Robust Routing of Highly Variable Traffic",Retrieved at <<http://conferences.sigcomm.org/hotnets/2004/HotNets-III%20Proceedings/kodialam.pdf>> 2004, pp. 6.
Lamport, Leslie, "The Part-Time Parliament", Retrieved at<<http://research.microsoft.com/en-us/um/people/lamport/pubs/lamport-paxos.pdf>> May 1998, vol. 16 , Issue 2, New York, USA, pp. 1-33.
Mathis, et al. "TCP Extended Statistics MIB", Retrieved at<<http://www.ietf.org/rfc/rfc4898.txt>> May 2007, pp. 1-71.
Plummber, David, C."An Ethernet Address Resolution Protocol—or—Converting Network Protocol Addresses" Retrieved at <<http://www.ietf.org/rfc/rfc826.txt>> Nov. 1982, pp. 1-8.
Thaler, et al. "Multipath Issues in Unicast and Multicast Next-Hop Selection", Retrieved at << http://delivery.acm.org/10.1145/rfc_fulltext/RFC2991/rfc2991.txt?key1=RFC2991&key2=5206323421&coll=GUIDE&dl=GUIDE&CFID=37275777&CFTOKEN=95281431>> Nov. 2000, pp. 1-9.
Zhang, et al. "Finding Critical Traffic Matrices" Retrieved at <<http://www.cs.utexas.edu/~yzhang/papers/critmat-dsn05.pdf>> Jun. 28-Jul. 1, 2005, pp. 1-10.
Zhang-Shen, et al. "Designing a Predictable Internet Backbone Network", Retrieved at <<http://citeseerx.ist.psu.edu/viewdoc/download;jsessionid=648B30D83F05493B77E6595130C060E8?doi=10.1.1.59.791&rep=rep1&type=pdf>>, pp. 6.

Chawla, et al. , "Replicating IP Services", Retrieved at <<http://reference.kfupm.edu.sa/content/r/e/replicating_ip_services_1179231.pdf>>, Technical Report 97-008, pp. 1-18.
"TCP Connection Forwarding", Retrieved at <<http://www.bluecoat.com/node/2804>>, pp. 4.
"Load Balancing", Retrieved at <<http://www.wilsonmar.com/1loadbal.htm>>, May 25, 2009, pp. 10.
"Softgrid Networking White paper", Retrieved at <<http://blog.caloni.net/post/369608/Softgrid+Networking+White+paper>>, May 11, 2007, pp. 2.
Bourke, Tony, "Bridge-Path vs. Route-Path Server Load Balancing", Retrieved at <<http://www.oreillynet.com/pub/a/oreilly/networking/news/bourke_1100.html>>, Nov. 11, 2000, pp. 6.
EPO Patent Appln. No. 10781358.6; European Supplementary Search Report dated Jan. 20, 2012.
Farinacci, V. et al.; "Locator/ID Separation Protocol (LISP)"; Internet Engineering Task Force, IETF; Internet Society, Geneva, Switzerland; May 26, 2009; 60 pages.
CN 201080023822.1, First Office Action Mailed Nov. 28, 2013 by the State Intellectual Property Office of the People's Republic of China, 12 pages.
EP 10781358.6, Examination Report Mailed Feb. 25, 2013 by the European Patent Office, 5 Pages.
EP 10781358.6, Applicant Response to the Feb. 25, 2013 Examination Report, Filed May 22, 2013, 15 pages.
"First Office Action and Search Report," from Chinese Patent Application No. 201080024662.2, Mailed Date: Apr. 30, 2014, 17 Pages.
"Office Action," from Japanese Patent Application No. 2012-513344, Mailed Date: Oct. 7, 2014, 8 Pages.
"Office Action," from Japanese Patent Application No. 2012-513344, Mailed Date: Mar. 11, 2014, 6 Pages.
"Office Action," from European Patent Application No. 10781358.6, Mailed Date: Feb. 5, 2015, 5 Pages.
"Second Office Action," from Chinese Patent Application No. 201080024662.2, Mailed Date: Dec. 19, 2014, 15 Pages.
"Response to Office Action," from Japanese Patent Application No. 2012-513344, Filed Jan. 6, 2015, 9 Pages.
"Response to 2nd Office Action," from Chinese Patent Application No. 201080024662.2, Filed Mar. 3, 2015, 12 Pages.
Request for Examination and Voluntary Amendment filed May 28, 2015, from Canadian Patent Application No. 2763032, 11 pages.
Response filed Sep. 15, 2014 to Office Action mailed Apr. 30, 2014, from Chinese Patent Application No. 201080024662.2, 12 pages.
Third Office Action and Search Report, mailed Jun. 24, 2015 , from Chinese Patent Application No. 2010800246622.2, 4 pages.
Office Action mailed Apr. 4, 2014, from European Patent Application No. 10781358.6, 7 pages.
Response filed Jul. 31, 2012 to Office Action mailed Apr. 4, 2014, from European Patent Application No. 10781358.6, 16 pages.
Response filed Jun. 3, 2015 to Office Action mailed Feb. 5, 2015, from European Patent Application No. 10781358.6, 17 pages.
Voluntary Amendment filed May 17, 2013 from Japanese Patent Application No. 2012-513344, 7 pages.
Response and Amendment filed Aug. 6, 2014 to Office Action mailed Mar. 11, 2014, from Japanese Patent Application No. 2012-513344, 11 pages.
Amendment filed May 11, 2015 from Korean Patent Application No. 10-2011-7028254, 32 pages.
Patel et al., "Load Balancing Across Layer-2 Domains," U.S. Appl. No. 61/182,057, filed May 28, 2009, 40 pages.
Non-Final Office Action mailed May 31, 2012, from U.S. Appl. No. 12/605,388, 6 pages.
Response filed Oct. 1, 2012 to Non-Final Office Action mailed May 31, 2012, from U.S. Appl. No. 12/605,388, 23 pages.
Notice of Allowance mailed Dec. 20, 2012, from U.S. Appl. No. 12/605,388, 5 pages.
International Search Report and Written Opinion mailed Dec. 27, 2010, from PCT Patent Application No. PCT/US2010/036757, 10 pages.
Voluntary Amendment filed Aug. 23, 2012 from Chinese Patent Application No. 201080023822.1, 8 pages.

(56) References Cited

OTHER PUBLICATIONS

Response filed Apr. 11, 2014 to First Office Action Voluntary Amendment filed Aug. 23, 2012, from Chinese Patent Application No. 201080023822.1, 11 pages.
Notice of Allowance mailed Jul. 9, 2014, from Chinese Patent Application No. 201080023822.1, 7 pages.
Search Report mailed Aug. 12, 2013, from European Patent Application No. 10781357.8, 7 pages.
Response filed Feb. 26, 2014 to Official Communication dated Aug. 29, 2013, from European Patent Application No. 10781357.8, 12 pages.
Office Action mailed Mar. 4, 2014, from Japanese Patent Application No. 2012-513343, 17 pages.
Response filed Jun. 3, 2014 to Office Action mailed Mar. 4, 2014, from Japanese Patent Application No. 2012-513343, 15 pages.
Second Office Action, mailed Sep. 2, 2014, from Japanese Patent Application No. 2012-513343, 8 pages.
Response filed Nov. 28, 2014 to Second Office Action mailed Sep. 2, 2014, from Japanese Patent Application No. 2012-513343, 12 pages.
Office Action mailed Apr. 21, 2015, from Japanese Patent Application No. 2012-513343, 3 pages.
Amendment filed Apr. 28, 2015, from Korean Patent Application No. 10-2011-7028169,19 pages.
Armbrust et al., "Above the Clouds: A Berkeley View of Cloud Computing," UC Berkeley Reliable Adaptive Distributed Systems Laboratory, Feb. 10, 2009, 23 pages.
Claffy et al., "A Parameterizable Methodology for Internet Traffic Flow Profiling," IEEE Journal on Selected Areas in Communications, vol. 13, No. 8, Oct. 1995, 14 pages.
Greenberg et al., "The Cost of a Cloud: Research Problems in Data Center Networks," CCR, vol. 39, No. 1, Jan. 2009, 6 pages.
Greenberg et al., "VL2: A Scalable and Flexible Data Center Network," SIGCOMM'09, Aug. 17-21, 2009, Barcelona, Spain, 12 pages.
Guo et al., "BCube: A High Performance, Server-centric Network Architecture for Modular Data Centers," SIGCOMM '09, Aug. 17-21, 2009, Barcelona, Spain, 12 pages.
Kandula et al., "Walking the Tightrope: Responsive Yet Stable Traffic Engineering," SIGCOMM '05, Aug. 21-26, 2005, 12 pages.
Sinha et al., "Harnessing TCP's Burstiness with Flowlet Switching," HotNets, 2004, 6 pages.
Yu et al., "Profiling Network Performance for Multi-Tier Data Center Applications," Proceedings of the 8th USENIX Conference on Networked Systems Design and Implementation, Mar. 2011, 14 pages.
"Warding Off Espionage with Network Forensics," WildPackets: Network Analysis and Monitoring Blog, published on Aug. 4, 2010, retrieved at <<http://blog.wildpackets.com/tag/data-capture>>, 2 pages.
"Configuring ERSPAN," retrieved at <<http://www.cisco.com/c/en/us/td/docs/switches/datacenter/sw/5_x/nx-os/system_management/configuration/guide/sm_nx_os_cg/sm_erspan.html>>, retrieved on Sep. 3, 2014, Cisco Systems, Inc., San Jose, CA, 9 pages.
"How to use Wireshark to capture a packet trace," retreived at <<http://www.novell.com/support/kb/doc.php?id=3892415>>, Novell, Inc., Provo, Utah, published on Mar. 25, 2008, 3 pages.
Arefin et al., "Scaling Data-Plane Logging in Large Scale Networks," Proceedings of MILCOM, Nov. 2011, 7 pages.
Argyraki et al., "Providing Packet Obituaries," Proceedings of the Third Workshop on Hot Topics in Networks, Nov. 2004, 6 pages.
Benson et al., "Network Traffic Characteristics of Data Centers in the Wild," Proceedings of the 10th ACM SIGCOMM Conference on Internet Measurement, Nov. 2010, 14 pages.
Corbet, Jonathan, "A JIT for packet filters," retrieved at <<http://lwn.net/Articles/437981/>>, published on Apr. 12, 2011, 6 pages.
Canini et al., "A Nice Way to Test Openflow Applications," Proceedings of the 9th USENIX Conference on Networked Systems Design and Implementation, Apr. 2012, 14 pages.

"Configuring Local SPAN, RSPAN, and ERSPAN," retrieved at <<http://www.cisco.com/c/en/us/td/docs/switches/lan/catalyst6500/ios/12-2SX/configuration/guide/book/span.pdf>> on Sep. 3, 2014, Cisco IOS Software Configuration Guide, Release 12.2SX, OL-13013-06, Chapter 16, Cisco Systems, Inc., San Jose, CA, 36 pages.
Claise, B. (Ed.), "Specification of the IP Flow Information Export (IPFIX) Protocol for the Exchange of IP Traffic Flow Information," retrieved at <<http://tools.ietf.org/pdf/rfc5101.pdf>>, Network Working Group, Request for Comments 5101, Jan. 2008, 63 pages.
Cox, Russ, "Regular Expression Matching: the Virtual Machine Approach," retrieved at <<http://swtch.com/~rsc/regexp/regexp2.html>>, published on Dec. 2009, 23 pages.
"cPacket Networks, Products Overview," retrieved at <<http://cpacket.com/products/>>, retrieved Jun. 2014, cPacket Networks, Mountain View, CA, 3 pages.
Cranor et al., "Gigascope: A Stream Database for Network Applications," Proceedings of the ACM SIGMOD International Conference on Management of Data, Jun. 2003, 5 pages.
Dean et al., "An Algebraic Approach to IP Traceback," ACM Transactions on Information and System Security, vol. 5, Issue 2, May 2002, 19 pages.
Duffield, Nick, "Fair Sampling Across Network Flow Measurements," Proceedings of the 12th ACM Sigmetrics/ Performance Joint International Conference on Measurement and Modeling of Computer Systems, Jun. 2012, 12 pages.
Duffield et al., "Trajectory Sampling for Direct Traffic Observation," IEEE/ACM Transactions on Networking, vol. 9, Issue 3, Jun. 2001, 13 pages.
"Visibility," Emulex Corporation, retrieved at <<http://www.emulex.com/visibility>> on Sep. 3, 2014, Emulex Corporation, Costa Mesa, CA, 2 pages.
Fonseca et al., "X-Trace: A Pervasive Network Tracing Framework," Proceedings of the 4th USENIX Conference on Networked Systems Design & Implementation, Apr. 2007, 14 pages.
"Intel® Ethernet Switch FM5000/FM6000 Series," retrieved at <<http://www.intel.com/content/www/us/en/switch-silicon/ethernet-switch-fm5000-fm6000-series.html>> on Sep. 3, 2014, Intel Corporation, Santa Clara, CA, 3 pages.
"Active Visability," Gigamon Inc., retrieved at <<http://www.gigamon.com/>> on Sep. 3, 2014, 3 pages.
Gude et al., "NOX: Towards an Operating System for Networks," ACM SIGCOMM Computer Communication Review, vol. 38, Issue 3, Jul. 2008, 6 pages.
Handigol et al., "Where is the Debugger for my Software-Defined Network?" Proceedings of the 1st Workshop on Hot Topics in Software Defined Networks, Aug. 2012, 6 pages.
Jacobson, V., "Compressing TCP/IP Headers for Low-Speed Serial Links," retrieved at <<http://tools.ietf.org/pdf/rfc1144.pdf>>, Network Working Group, Request for Comments 1144, Feb. 1990, 45 pages.
Kazemian et al., "Real Time Network Policy Checking Using Header Space Analysis," Proceedings of the 10th USENIX Conference on Networked Systems Design and Implementation, Apr. 2013, 13 pages.
Kazemian et al., "Header Space Analysis: Static Checking for Networks," Proceedings of the 9th USENIX Conference on Networked Systems Design and Implementation, Apr. 2012, 14 pages.
"LBNL/ICSI Enterprise Tracing Project," retrieved at <<http://www.icir.org/enterprise-tracing/Overview.html>>, Lawrence Berkeley National Laboratory and ICSI, published on Jul. 30, 2013, 1 page.
"NEC IP8800 OpenFlow Networking," retrieved at <<http://support.necam.com/pflow/ip8800/>>, NEC Corporation, Minato, Tokyo, 1 page.
"Architecting Visibility Into Your Network," Net Optics Inc., retrieved at <<http://www.netoptics.com/>> on Sep. 3, 2014, 1 page.
"Open vSwitch: An Open Virtual Switch," retrieved at http://openvswitch.org/>> on Sep. 3, 2014, 1 page.

(56) References Cited

OTHER PUBLICATIONS

"Embrane heleos-powered Load Balancer," retrieved at <<http://www.embrane.com/products/load-balancer>> on Mar. 21, 2014, Embrane, Inc., Santa Clara, CA, 2 pages.
"F5 Networks," retrieved at <<http://en.wikipedia.org/wiki/F5_Networks>> on Mar. 21, 2014, Wikipedia entry, 6 pages.
"HaProxy: The Reliable, High Performance TCP/HTTP Load Balancer," retrieved at <<http://haproxy.1wt.eu/>> on Mar. 21, 2014, 12 pages.
"Why do I need two load balancers?" retrieved at <<http://www.loadbalancer.org/>> on Mar. 21, 2014, 2 pages.
"NetScaler Application Delivery Controller," retrieved at <<http://www.citrix.com/netscalervpx>> on Mar. 21, 2014, Citrix Systems, Inc., Santa Clara, CA , 2 pages.
Alizadeh et al., "Data Center TCP," Proceedings of the ACM SIGCOMM 2010 Conference, 2010, 12 pages.
Bodik et al., "Surviving Failures in Bandwidth-Constrained Datacenters," Proceedings of the ACM SIGCOMM 2012 Conference on Applications, Technologies, Architectures, and Protocols for Computer Communication, 2012, 12 pages.
Fayazbakhsh et al., "Flowtags: Enforcing Network-Wide Policies in the Presence of Dynamic Middlebox Actions," Proceedings of the Second ACM SIGCOMM Workshop on Hot topics in Software Defined Networking, Aug. 2013, 6 pages.
Gill et al., "Understanding Network Failures in Data Centers: Measurement, Analysis, and Implications," ACM SIGCOMM Computer Communication Review, vol. 41, 2011, 12 pages.
Hamilton, James, "The Cost of Latency," retrieved at <<http://perspectives.mvdirona.com/2009/10/31/TheCostOfLatency.aspx>>, Perspectives: James Hamilton's Blog, Oct. 31, 2009, 3 pages.
Handigol et al., "Plug-n-Serve: Load-Balancing Web Traffic Using Openflow," ACM SIGCOMM Demo, 2009, 2 pages.
Morshref et al., "Scalable Rule Management for Data Centers," Proceedings of the 10th USENIX Conference on Networked Systems Design and Implementation, Apr. 2013, 14 pages.
Qazi et al., "Simple-fying Middlebox Policy Enforcement Using SDN," Proceedings of the ACM SIGCOMM 2013 Conference on SIGCOMM, Aug. 2013, 12 pages.
Ravindranath et al., "Timecard: Controlling User-Perceived Delays in Server-Based Mobile Applications," Proceedings of the Twenty-Fourth ACM Symposium on Operating Systems Principles, Nov. 2013, 16 pages.
Wang et al., "OpenFlow-Based Server Load Balancing Gone Wild," Proceedings of the 11th USENIX Conference on Hot Topics in Management of Internet, Cloud, and Enterprise Networks and Services, 2011, 6 pages.
Wu et al., "Netpilot: Automating Datacenter Network Failure Mitigation," ACM SIGCOMM Computer Communication Review, Special October Issue, SIGCOMM '12, vol. 42, Issue 4, Aug. 2012, 12 pages.
Yu et al., "Scalable Flow-Based Networking with DIFANE," Proceedings of the ACM SIGCOMM 2010 Conference, 2010, 12 pages.
Lu et al., "Using CPU as a Traffic Co-processing Unit in Commodity Switches," Proceedings of the 1st Workshop on Hot Topics in Software Defined Networks, 2012, 6 pages.
"DPDK: Data Plane Development Kit," retrieved at <<http://www.dpdk.org/>> on Mar. 25, 2015, 2 pages.
"Receive Side Scaling," retrieved at <<https://msdn.microsoft.com/en-us/library/windows/hardware/ff567236(v=vs.85).aspx>> on Mar. 25, 2015, Microsoft Corporation, Redmond, WA, 1 page.
Case et al., "A Simple Network Management Protocol," retrieved at <<https://www.ietf.org/rfc/rfc1157.txt>>, Network Working Group, Request for Comments 1157, May 1990, 34 pages.
Chaiken et al., "SCOPE: Easy and Efficient Parallel Processing of Massive Data Sets," Proceedings of the Very Large Data Bases Endowment, vol. 1, Issue 2, Aug. 2008, 12 pages.
Claise, B. (Ed.), "Cisco Systems NetFlow Services Export Version 9," retrieced at <<https://tools.ietf.org/html/rfc3954>>, Network Working Group, Request for Comments 3954, Oct. 2004, 33 pages.

Fayaz et al., "Testing Stateful and Dynamic Data Planes with FlowTest," Proceedings of the Third Workshop on Hot Topics in Software Defined Networking, Aug. 22, 2014, 6 pages.
Gandhi et al., "Duet: Cloud Scale Load Balancing with Hardware and Software," Proceedings of the ACM Conference on SIGCOMM, Aug. 17, 2014, 12 pages.
Gvozdiev et al., "LOUP: Who's Afraid of the Big Bad Loop?," Proceedings of the 11th ACM Workshop on Hot Topics in Networks, Oct. 2012, 6 pages.
Hong et al., "Tiresias: Online Anomaly Detection for Hierarchical Operational Network Data," Proceedings of the IEEE 32nd International Conference on Distributed Computing Systems, Jun. 2012, 10 pages.
"InfiniBand Architecture Specifications vol. 1, Version 1.2.1," retrieved at <<http://www.infinibandta.org/content/pages.php?pg=technology_public_specification>>, InfiniBand Trade Association, Nov. 2007, 1727 pages.
Jeyakumar et al., "Millions of Little Minions: Using Packets for Low Latency Network Programming and Visibility," Proceedings of the ACM Conference on SIGCOMM, Aug. 17, 2014,12 pages.
Kandula et al., "The Nature of Data Center Traffic: Measurements & Analysis," Proceedings of the 9th ACM SIGCOMM Conference on Internet Measurement Conference, Nov. 2009, 7 pages.
Perkins, C, "IP Encapsulation within IP," Oct. 1996, available at <<http://tools.ietf.org/search/rfc2003>>, 15 pages.
"Rackspace: The Leader in Hybrid Cloud," retrieved on Dec. 20, 2013 at <<http://www.rackspace.com/>>, 2 pages.
"Riverbed," retrieved on Dec. 20, 2013 at <<http://www.riverbed.com>>, 2 pages.
"Microsoft Developer Network," retrieved on Dec. 20, 2013 at <<http://msdn.microsoft.com/en-gb/defaultaspx>>, 3 pages.
Sekar et al., "The Middlebox Manifesto: Enabling Innovation in Middlebox Deployment," Proceedings of 10th ACM Workshop on Hot Topics in Networks, Nov. 14, 2011, 6 pages.
Sherry et al., "Making Middleboxes Someone Else's Problem: Network Processing as a Cloud Service," Proceedings of ACM SIGCOMM Conference on Applications, Technologies, Architectures, and Protocols for Computer Communication, Aug. 13, 2012, 12 pages.
Dixon et al., "ETTM: A Scalable Fault Tolerant Network Manager," Proceedings of 8th USENIX Conference on Networked Systems Design and Implementation, Mar. 30, 2011, 14 pages.
"Vyatta Software Middlebox," retrieved on Dec. 20, 2013 at <<http://www.vyatta.com>>, 1 page.
Welsh et al., "SEDA: An Architecture for Well-Conditioned, Scalable Internet Services," Proceedings of 18th ACM Symposium on Operating Systems Principles, Oct. 21, 2001, 14 pages.
"Windows Filtering Platform," retrieved on Dec. 20, 2013 at <<http://msdn.microsoft.com>>, 2 pages.
"Zscaler," retrieved on Dec. 20, 2013 at <<http://www.zscaler.com/>>, 2 pages.
"NEC ProgrammableFlow Technical Support," retrieved Jun. 16, 2014 at <<http://support.necam.com/pflow/legacy/ip8800/>>, 1 page.
Zhang et al., "Collecting and Analyzing Selected Network Traffic," U.S. Appl. No. 14/475,927, filed Sep. 3, 2014, 62 pages.
Zhang et al., "Switch-based Load Balancer," U.S. Appl. No. 14/221,056, filed Mar. 20, 2014, 65 pages.
Zhang et al., "Measuring Performance of a Network Using Mirrored Probe Packets," U.S. Appl. No. 14/726,245, filed May 29, 2015, 72 pages.
Dally et al., "Principles and Practices of Interconnection Networks," Morgan Kaufmann Publishers, 2004.
Jain, Raj, "The Art of Computer Systems Performance Analysis," John Wiley and Sons, Inc., 1991.
Koponen et al., "Network Virtualization in Multi-tenant Datacenters," Proceedings of the 11th USENIX Symposium on Networked Systems Design and Implementation, Apr. 2, 2014, 15 pages.
Liu et al., "SAND: A Fault-Tolerant Streaming Architecture for Network Traffic Analytics," Proceedings of the 44th Annual IEEE/IFIP International Conference on Dependable Systems and Networks, Jun. 23, 2014, 8 pages.

(56) References Cited

OTHER PUBLICATIONS

Mahajan et al., "User-Level Internet Path Diagnosis," Proceedings of the Nineteenth ACM Symposium on Operating Systems Principles, Oct. 2003, 14 pages.
Malkin, G., "Traceroute Using an IP Option," retrieved at <<http://www.rfc-base.org/txt/rfc-1393.txt, Network Working Group, Request for Comments 1393, Jan. 1993, 7 pages.
Marchetta et al., "Dissecting Round Trip Time on the Slow Path with a Single Packet," Proceedings of the15th International Conference on Passive and Active Measurement, Mar. 10, 2014, 10 pages.
Phaal et al., "InMon Corporation's sFlow: A Method for Monitoring Traffic in Switched and Routed Networks," retrieved at <<https://tools.ietf.org/html/rFc3176>>, Network Working Group, Request for Comments 3176, Sep. 2001, 31 pages.
Qiu et al., "What Happened in My Network? Mining Network Events from Router Syslogs," Proceedings of the 10th ACM SIGCOMM Conference on Internet Measurement, Nov. 2010, 13 pages.
Rasley et al., "Planck: Millisecond-scale Monitoring and Control for Commodity Networks," Proceedings of the ACM Conference on SIGCOMM. Aug. 17, 2014, 12 pages.
Rizzo, Luigi, "netmap: a novel framework for fast packet I/O," Proceedings of the 21st USENIX Security Symposium, Aug. 2012, 12 pages.
Wu et al., "WireCAP: a Novel Packet Capture Engine for Commodity NICs in High-Speed Networks," Proceedings of the Conference on Internet Measurement Conference, Nov. 2014, 12 pages.
Yu et al., "Software Defined Traffic Measurement with OpenSketch," Proceedings of 10th USENIX Symposium on Networked Systems Design and Implementation, Apr. 2013, 14 pages.
Zou et al., "PktTrace: A Packet Life-Cycle Tracking Tool for Network Services in a Software-Defined Data Center," VMware Technical Journal, Jun. 27, 2014, 6 pages.
Sommers et al., "A Geometric Approach to Improving Active Packet Loss Measurement," IEEE/ACM Transactions on Networking, vol. 16, Issue 2, Apr. 2008, 14 pages.
Wundsam et al., "OFRewind: Enabling Record and Replay Troubleshooting for Networks," Proceedings of the USENIX Annual Technical Conference, Jun. 2011, 14 pages.
Zeng et al., "Automatic Test Packet Generation," Proceedings of the 8th International Conference on Emerging Networking Experiments and Technologies, Dec. 2012, 12 pages.
Handigol et al., "I Know What Your Packet Did Last Hop: Using Packet Histories to Troubleshoot Networks," Proceedings of the 11th USENIX Symposium on Networked Systems Design and Implementation (NSDI '14), Apr. 2014, 16 pages.
Wu et al., "Virtual Network Diagnosis as a Service," Proceedings of the 4th Annual Symposium on Cloud Computing, Oct. 2013, 15 pages.
Shenker, Scott, "The Future of Networking, and the Past of Protocols," slide presentation, Open Networking Summit, Oct. 2011, 30 pages.
Snoeren et al., "Hash-Based IP Traceback," Proceedings of the ACM SIGCOMM Conference on Applications, Technologies, Architectures, and Protocols for Computer Communication, Aug. 2001, 12 pages.
Sekar et al., "CSAMP: A System for Network-Wide Flow Monitoring," Proceedings of the 5th USENIX Symposium on Networked Systems Design and Implementation, Apr. 2008, 14 pages.
Savage et al., "Practical Network Support for IP Traceback," Proceedings of the ACM SIGCOMM Conference on Applications, Technologies, Architectures, and Protocols for Computer Communication, Aug. 2000, 12 pages.
Rosenblum et al., "The Design and Implementation of a Log-Structured File System," ACM Transactions on Computer Systems, vol. 10, Issue 1, Feb. 1992, 27 pages.

McCanne et al., "The BSD Packet Filter: A New Architecture for User-Level Packet Capture," Proceedings of the USENIX Winter Conference, Jan. 1993, 12 pages.
Mai et al., "Debugging the Data Plane with Anteater," Proceedings of the ACM SIGCOMM Conference on Applications, Technologies, Architectures, and Protocols for Computer Communications, Aug. 2011, 12 pages.
Lantz et al., "A Network in a Laptop: Rapid Prototyping for Software-Defined Networks," Proceedings of the 9th ACM SIGCOMM Workshop on Hot Topics in Networks, Oct. 2010, 6 pages.
Kobayashi et al., "Maturing of OpenFlow and Software-defined Networking through deployments," Computer Networks, vol. 61, Mar. 2014, 25 pages.
Khurshid et al., "VeriFlow: Verifying Network-Wide Invariants in Real Time," Proceedings of the 10th USENIX Conference on Networked Systems Design and Implementation, Apr. 2013, 13 pages.
Khurshid et al., "VeriFlow: Verifying Network-Wide Invariants in Real Time," Proceedings of 1st Workshop on Hot Topics in Software Defined Networks, Aug. 2012, 6 pages.
Handigol, Nikhil Ashok, "Using Packet Histories to Troubleshoot Networks," Thesis of Doctor of Philosophy, Stanford University, Stanford, CA, Jun. 2013, 118 pages.
Santos et al., "Multi-Hop Packet Tracking for Experimental Facilities," Proceedings of the ACM SIGCOMM Conference on Applications, Technologies, Architectures, and Protocols for Computer Communications, Aug. 2010, 2 pages.
Phaal et al., "sFlow Version 5," retrieved at <<http://sflow.org/sflow_version_5.txt>>, published Jul. 2004, 47 pages.
"The POX Controller," published on Oct. 14, 2013, retrieved at <<https://github.com/noxrepo/pox>> on Sep. 3, 2014, 2 pages.
Heller, Brandon, "RipL-POX (Ripcord-Lite for POX): A Simple Network Controller for Open Flow-based Data Centers," published on Jun. 21, 2013, retrieved at <<https://github.com/brandonheller/riplpox>> on Sep. 3, 2014, 2 pages.
Splunk Inc. home page, retrieved at <<http://www.splunk.com/>> on Sep. 3, 2014, Splunk Inc., San Francisco, CA, 2 pages.
"The CAIDA Anonymized Internet Traces 2012 Dataset," Jul. 2014, retrieved at <<http://www.caida.org/data/passive/passive$_{13}$_2012_dataset.xml>> on Sep. 3, 2014, Center for Applied Internet Data Analysis, 2 pages.
Rekhter (Ed.) et al., "A Border Gateway Protocol 4 (BGP-4)," retrieved at <<http://tools.ietf.org/pdf/rfc4271.pdf>>, Network Working Group, Request for Comments 4271, Jan. 2006, 104 pages.
Farinacci et al., "Generic Routing Encapsulation (GRE)," retrieved at <<http://tools.ietf.org/pdf/rfc2784.pdf>>, Network Working Group, Request for Comments 4271, Mar. 2000, 9 pages.
Cranor et al., "Gigascope: High Performance Network Monitoring with an SQL Interface," Proceedings of ACM SIGMOD International Conference on Management of Data, Jun. 3, 2002, 1 page.
Zhu et al., "Packet-Level Telemetry in Large Datacenter Networks," SIGOMM '15, Aug. 17-21, 2015, London, United Kingdom, 13 pages.
Bosshart et al., "Forwarding Metamorphosis: Fast Programmable Match-Action Processing in Hardware for SDN," SIGCOMM '13, Aug. 12-16, Hong Kong, China, 12 pages.
Fogel et al., "A General Approach to Network Configuration Analysis," NSDI, 2015, 15 pages.
Hong et al., "Achieving High Utilization with Software-Driven WAN," SIGCOMM '13, Aug. 12-16, 2013, Hong Kong, China, 12 pages.
InfiniBand Trade Association, "Supplement to InfiniBand Architecture Specification," vol. 1 Release 1.2.2 annex A17: RoCEv2, 2014, 23 pages.
Jain et al., "B4: Experience with a Globally-Deployed Software Defined WAN," SIGCOMM '13, Aug. 12-16, 2013, Hong Kong, China, 12 pages.
Mann et al., "Living on the edge: Monitoring network flows at the edge in cloud data centers," COMSNET, 2013 IEEE, 9 pages.
Suh et al., "Opensample: A Low-Latency, Sampling-Based Measurement Platform for SDN," ICDCS, 2014, 10 pages.

(56) References Cited

OTHER PUBLICATIONS

"A10 Customer Driven Innovation," retrieved on Dec. 20, 2013 at <<http://www.a10networks.com/>>, 1 page.
"Aryaka," retrieved on Dec. 20, 2013 at <<http://www.aryaka.com/>>, 4 pages.
"Amazon Web Services," retrieved on Dec. 20, 2013 at <<http://aws.amazon.com/>>, 2 pages.
Microsoft Windows Azure, retrieved on Dec. 20, 2013 at <<http://www.windowsazure.com/en-us/>>, 2 pages.
Benson et al., "CloudNaaS: A Cloud Networking Platform for Enterprise Applications," Proceedings of 2nd ACM Symposium on Cloud Computing, Oct. 26, 2011, 13 pages.
Dobrescu et al., "RouteBricks: Exploiting Parallelism to Scale Software Routers," Proceedings of ACM SIGOPS 22nd Symposium on Operating Systems Principles, Oct. 11, 2009, 13 pages.
Dobrescu et al., "Towards High Performance Virtual Routers on Commodity Hardware," Proceedings of ACM CoNEXT Conference, Dec. 9, 2008, 14 pages.
"Embrane," retrieved on Dec. 20, 2013 at <<http://www.embrane.com/>>, 1 page.
"F5 Networks," retrieved on Dec. 20, 2013 at <<http://www.f5.com/>>, 1 page.
"Google Cloud Platform," retrieved on Dec. 20, 2013 at <<https://cloud.google.com/>>, 8 pages.
Heffernan, A, "Protection of BGP Sessions via the TCP MD5 Signature Option," Aug. 1998, Available at <<http://www.ietf.org/rfc/rfc2385.txt>>, 6 pages.
McKeown et al., "OpenFlow: Enabling Innovation in Campus Networks," Proceedings of ACM SIGCOMM Computer Communication Review, vol. 38, Issue 2, Apr. 2008, 6 pages.
"Citrix delivers Cloud Solutions that enable Mobile Workstyles," retrieved on Dec. 20, 2013 at <<http://www.citrix.com/>>, 2 pages.
"Green IT," retrieved at <<http://www-03.ibm.com/systems/greendc/>>, retrieved on Mar. 29, 2010, IBM Corporation, Armonk, NY, 3 pages.
Costa et al., "Why Should We Integrate Services, Servers, and Networking in a Data Center?", Proceedings of the 1st ACM Workshop on Research on Enterprise Networking, 2009, pp. 111-117, 7 pages.
Hernandez, Pedro, "Startups Go Wireless for Data Center Energy Management," retrieved at <<http://earth2tech.com/2009/09/08/startups-go-wireless-for-data-center-energy-managemenU>> on Mar. 29, 2010, Earth2Tech, Sep. 8, 2009, 3 pages.
Kandula et al., "Flyways to De-Congest Data Center Networks," retrieved at <<http://conferences.sigcomm.org/hotnets/2009/papers/hotnets2009-final112.pdf>>, HotNets 2009, 6 pages.
Ohara, Dave, "Build a Green Datacenter," retrieved at <<http://technet.microsoft.com/en-us/magazine/2009.gr.datacenter.aspx>> on Mar. 29, 2010, TechNet Magazine, Oct. 2007, 6 pages.
Ramachandran et al., "60 GHz Data-Center Networking: Wireless Worry less?," retrieved at <<http://www.nec-labs.com/-kishore/papers/60GHz-DC.pdf>>, NEC Technical Report, Jul. 14, 2008, 11 pages.
Wexler, Joanie, "Wireless helps hone data center efficiencies," retrieved at <<http://www.networkworld.com/newsletters/wireless/2009/102609wireless1.html>>, Network World, Oct. 23, 2009, 2 pages.
International Search Report and Written Opinion mailed Nov. 29, 2011 from PCT Patent Application No. PCT/US2011/030050, 8 pages.
Applicant Initiated Examiner Interview and Response filed Oct. 15, 2015 to Non-Final Office Action mailed Jul. 15, 2015 from U.S. Appl. No. 14/221,056,19 pages.
Response filed Oct. 27, 2015 to the International Search Report and Written Opinion mailed Jul. 7, 2015 from PCT Patent Application No. PCT/US2015/021124, 19 pages.
Intention to Grant mailed Sep. 30, 2015 from European Patent Application No. 10781358.6, 55 pages.
Response filed Oct. 26, 2015 to Communication under R. 71(3) EPC from European Patent Application No. 10781358.6, 15 pages.
International Preliminary Report on Patentability mailed Oct. 9, 2012 from PCT Patent Application No. PCT/US11/30050, 4 pages.
Examination Report mailed Jul. 4, 2013 from European Patent Application No. 11766409.4, 6 pages.
Response filed Nov. 5, 2013 to Examination Report mailed Jul. 4, 2013 from European Patent Application No. 11766409.4, 20 pages.
Communication under Rule 71(3) EPC Intention to Grant mailed Dec. 16, 2013 from European Patent Application No. 11766409.4, 48 pages.
Response filed May 21, 2015 to First Office Action from China Patent Application No. 201180017112.2, 16 pages.
Second Office Action mailed Sep. 24, 2015 from China Patent Application No. 201180017112.2, 6 pages.
"Wireless Gigabit Alliance," retrieved at <<http://wirelessgigabitalliance.org/>>, May 14, 2010,1 page.
"WirelessHD," retrieved at <<http://wirelesshd.org/>>, Mar. 24, 2010, 1 page.
Barroso et al., "The Datacenter as a Computer—An Introduction to the Design of Warehouse-Scale Machines," Morgan & Claypool, 2009, 120 pages.
Dean et al., "MapReduce: Simplified Data Processing on Large Clusters," OSDI, 2004, 26 pages.
Ghemawat et al., "The Google File System," SOSP '03, Oct. 19-22, 2003, Bolton Landing, New York, 15 pages.
Guo et al., "Bcube: High Performance, Server-centric Network Architecture for Modular Data Centers," SIGCOMM '09, Aug. 17-21, 2009, Barcelona, Spain, 12 pages.
Kandula et al., "Walking the Tightrope: Response Yet Stable Traffic Engineering," SIGCOMM '05, Aug. 21-26, 2005, Philadelphia, PA, 12 pages.
Sibeam, "Benefits of 60 GHz," Sibeam Whitepapers, Nov. 2005, Retreived at <<https://www.google.com/?gws_rd=ssl#q=SiBeam%2C+%22The+Benefits+of+60+Hz%22 >> on Aug. 24, 2015, 5 pages.
Sibeam, "A 4-GBPD Uncompressed Wireless HD A/V Transceiver Chipset," 2008 IEEE, 9 pages.
Sibeam, "60 GHz Architecture for Wireless Video Display" <<http://sibeam.com>>, Mar. 2006, 6 pages.
Smulders, "Exploiting the 60GHz Band for Local Wireless Multimedia Access: Prospects and Future Directions," IEEE Communications Magazine, Jan. 2002, 8 pages.
Van Winkle, William, "Beamforming: The Best WiFi You've Never Seen," Aug. 17, 2009, Retrieved at <<http://www.tomshardware.com/reviews/beamforming-wifi-ruckus,2390.html>> on Aug. 24, 2015, 19 pages.
"Event Tracing for Windows," retreived at <<http://msdn.microsoft.com/en-us/library/ms751538.aspx>>, Mar. 5, 2010, 3 pages.
Wells, Jonathan, "Multigigabit wireless connectivity at 70, 80 and 90 GHz," May 1, 2006, retrieved at http://mobiledevdesign.com/hardware_news/radio_multigigabit_wireless_connectivity/>> on Oct. 13, 2009, 8 pages.
U.S. Appl. No. 61/250,013 titled "Flyways in Data Centers," by Jitendra Padhye, filed Oct. 9, 2009, 18 pages.
International Preliminary Report on Patentability mailed Apr. 11, 2012 from PCT Patent Application No. PCT/US2010/051698, 6 pages.
Response filed Apr. 30, 2014 to Office Action and Search Report mailed Dec. 20, 2013 from China Patent Application No. 201080045182.4, 13 pages.
Response filed Oct. 21, 2014 to Office Action and Search Report mailed Aug. 7, 2014 from China Patent Application No. 201080045182.4, 13 pages.
Third Office Action mailed Jan. 13, 2015 from China Patent Application No. 201080045182.4, 9 pages.
Response filed Mar. 27, 2015 to Third Office Action mailed Jan. 13, 2015 from China Patent Application No. 201080045182.4, 12 pages.
Fourth Office Action mailed Jul. 13, 2015 from China Patent Application No. 201080045182.4, 7 pages.
Response filed Sep. 28, 2015 to Fourth Office Action mailed Jul. 13, 2015 from China Patent Application No. 201080045182.4, 13 pages.

(56) References Cited

OTHER PUBLICATIONS

Response filed Jul. 7, 2014 to Office Action mailed May 21, 2014 from Japan Patent Application No. 2012-533293, 9 pages.
Aryaka home page, retrieved from <<http://arayaka.com>> on Dec. 20, 2013, 4 pages.
Dobrescu et al., "RouteBricks: Exploiting Parallelism to Scale Software Routers," Proceedings of ACM SIGOPS 22nd Symposium on Operating Systems Principles, Oct. 11, 2009, 14 pages.
Egi et al., "Towards High Performance Virtual Routers on Commodity Hardware," Proceedings of ACM CoNEXT Conference, Dec. 9, 2008, 12 pages.
Request for Examination with Voluntary Amendment filed Apr. 23, 2015 from Canada Patent Application No. 2,759,957, 28 pages.
Office Action mailed Sep. 23, 2015 from European Patent Application No. 10781357.8, 3 pages.
Second Office Action mailed Dec. 19, 2014 from China Patent Application No. 201080024662.2, 15 pages.
Schoedel, Eric, "Gigabit Wireless for Network Connectivity", Educause Quarterly, vol. 32, No. 2, Nov. 2, 2009, Retrieved at <<http://www.educause.edu/EDUCAUSE+Quarterly/ EDUCAUSEQuarterlyMagaA67:A75zineVolum/ GigabitWirelessforNetworkConne/174585>>, 7 pages.
Robinson, Rick, "New Wireless 60 GHz Standard Promises Ultra-Fast Applications", Jan. 15, 2009, Retrieved at <<http://www. physorg.com/news151258225.html>> on Oct. 13, 2009, 9 pages.
"Deploying 10 Gigabit Ethernet with Cisco Nexus 5000 Series Switches", May 2009, Retrieved on Oct. 13, 2009 at <<http://www. cisco.com/en/US/prod/collateral/switches/A67:A75ps9441/ps9670/ white_paper_c27-489248_ns783_Networking_Solutions_ White_Paper.html>>, 6 pages.
Mellor, Chris, "VirtenSys PCIe cloud Switch arrives", Feb. 24, 2009, Retrieved on Oct. 13, 2009 at <<http://www.theregisterco. uk/2009/02/24/vitensys_pcie_switch/>>, 2 pages.
"Advance Program", May 20, 2007, HSD 2007 Workshop on Interconnections within High Speed Digital Systems (HSD), 7 pages.
Handigol et al., "Plug-n-Serve: Load-Balancing Web Traffic using OpenFlow", 2009, Retrieved at <<http://conferences.sigcomm.org/ sigcomm/2009/demos/sigcomm-pd-2009-final26.pdf>>, 2 pages.
"Sun Steps Up With Terascale Computing and On-Demand Capacity", 1994-2009, Retrieved on Oct. 13, 2009 at <<http://www.sun. com/aboutsun/media/features/terascale.html >>, 2 pages.
McGillicuddy, Shamus, "Cisco expands Nexus data center switch line with eye on virtualization", Jan. 28, 2009, Retrieved on Oct. 13, 2009 at <<http://searchnetworking.techtarget.com/news/article/ 0,289142,sid7_gci1346229,00.html>>, 4 pages.
Untz et al., "On Demand Label Switching for Spontaneous Edge Networks", SIGCOMM '04 Workshops, Aug. 30-Sep. 3, 2004, pp. 35-42, 8 pages.
International Search Report mailed Jun. 16, 2011, PCT Patent Application No. PCT/US2010/051698, 11 pages.
Office Action and Search Report mailed Dec. 20, 2013 from China Patent Application No. 201080045182.4, 11 pages.
Office Action and Search Report mailed Aug. 7, 2014 from China Patent Application No. 201080045182.4, 15 pages.
Office Action mailed May 21, 2014 from Japan Patent Application No. 2012-533293, 8 pages.
Response filed Apr. 24, 2015 to First Office Action mailed Jan. 27, 2015 from Japan Patent Application No. 2013-503779, 9 pages.
Notice of Allowance mailed May 19, 2015 from Japan Patent Application No. 2013-503779, 2015, 6 pages.
Response filed Oct. 22, 2014 to Examination Report mailed Oct. 17, 2014 from European Patent Application No. 14173710.6, 14 pages
Intention to Grant mailed Dec. 16, 2014 from European Patent Application No. 14173710.6, 5 pages.
Response filed Oct. 13, 2014 to Examination Report mailed Oct. 7, 2014 from European Patent Application No. 14173698.3, 14 pages.
Intention to Grant mailed Dec. 17, 2014 from European Patent Application No. 14173636.3, 5 pages.

Non-Final Office Action mailed Aug. 30, 2012 from U.S. Appl. No. 12/723,697, 12 pages.
Response filed Apr. 1, 2013 to Non-Final Office Action from U.S. Appl. No. 12/723,697, 13 pages.
Final Office Action mailed Jun. 6, 2013 from U.S. Appl. No. 12/723,697, 13 pages.
RCE/Response filed Aug. 1, 2013 to Final Office Action mailed Jun. 6, 2013 from U.S. Appl. No. 12/723,697, 17 pages.
Non-Final Office Action mailed Sep. 30, 2013 from U.S. Appl. No. 12/723,697, 17 pages.
Response filed Dec. 30, 2013 to Non-Final Office Action mailed Sep. 30, 2013, from U.S. Appl. No. 12/723,697, 15 pages.
Final Office Action mailed Apr. 10, 2014 from U.S. Appl. No. 12/723,697, 13 pages.
RCE/Response filed Jun. 26, 2014 to Final Office Action mailed Apr. 10, 2014 from U.S. Appl. No. 12/723,697, 19 pages.
Notice of Allowance mailed Nov. 14, 2014 from U.S. Appl. No. 12/723,697, 11 pages.
Shin et al., "On the Feasibility of Completely Wireless Data Centers", Technical Reports, Cornell University, 2011, 13 pages.
Request for Examination and Voluntary Amendment filed Aug. 20, 2013 from Japan Patent Application No. 2012-533293, 8 pages.
Notice of Allowance mailed Sep. 12, 2014 from Japan Patent Application No. 2012-533293, 4 pages.
Request for Examination and Voluntary Amendment filed Sep. 9, 2015 from Korea Patent Application No. 10-2012-7009062, 19 pages.
Search Report mailed Sep. 24, 2014 from European Patent Application No. 14173636.3, 3 pages.
Examination Report mailed Oct. 7, 2014 from European Patent Application No. 14173698.3, 5 pages.
Search Report mailed Sep. 24, 2014 from European Patent Application No. 14173698.3, 3 pages.
Examination Report mailed Oct. 17, 2014 from European Patent Application No. 14173710.6, 5 pages.
Search Report mailed Oct. 7, 2014 from European Patent Application No. 14173710.6, 3 pages.
First Office Action mailed Jan. 6, 2015 from China Patent Application No. 201180017112.2, 18 pages.
Intention to Grant mailed Nov. 6, 2014 from European Patent Application No. 14173698.3, 47 pages.
Office Action mailed Jan. 27, 2015 from Japan Patent Application No. 2013-503779, 4 pages.
Response filed Oct. 23, 2014 to Examination Report mailed Oct. 7, 2014 from European Patent Application No. 14173636.3, 13 pages.
Non-Final Office Action mailed Dec. 17, 2012 from U.S. Appl. No. 12/753,913, 18 pages.
Response filed Apr. 17, 2013 to Non-Final Office Action mailed Dec. 17, 2012 from U.S. Appl. No. 12/753,913, 14 pages.
Final Office Action mailed Jul. 25, 2013 from U.S. Appl. No. 12/753,913, 20 pages.
Response filed Oct. 25, 2013 to Final Office Action mailed Jul. 25, 2013 from U.S. Appl. No. 12/753,913, 13 pages.
Non-Final Office Action mailed Feb. 26, 2015 from U.S. Appl. No. 12/753,913, 22 pages.
Response filed Jun. 4, 2015 to Non-Final Office Action mailed Feb. 26, 2015 from U.S. Appl. No. 12/753,913, 12 pages.
Final Office Action mailed Jun. 30, 2015 from U.S. Appl. No. 12/753,913, 22 pages.
Response filed Sep. 8, 2015 to Final Office Action mailed Jun. 30, 2015 from U.S. Appl. No. 12/753,913, 10 pages.
Notice of Allowance and Examiner Initiated Interview Summary mailed Oct. 7, 2015 from U.S. Appl. No. 12/753,913, 10 pages.
Examination Report mailed Oct. 7, 2014 from European Patent Application No. 14173636.3, 5 pages.
Response filed Sep. 8, 2015 to Third Office Action from China Patent Application No. 201080024662.2, 13 pages.
International Preliminary Report on Patentability and Written Opinion mailed Nov. 29, 2011 from PCT Patent Application No. PCT/ US2010/036758, 5 pages.
Greenberg et al., "Agile Data Center Network Architecture," U.S. Appl. No. 61/182,063, filed May 28, 2009, 46 pages.

(56) References Cited

OTHER PUBLICATIONS

International Preliminary Report on Patentability and Written Opinion mailed Nov. 29, 2011 from PCT Patent Application No. PCT/US2010/036757, 6 pages.
Notice of Appeal filed Aug. 21, 2015 from Japan Patent Application No. 2012-513343, 18 pages.
Non-Final Office Action mailed Jul. 15, 2015 from U.S. Appl. No. 14/221,056, 18 pages.
International Search Report and Written Opinion mailed Jul. 7, 2015 from PCT Patent Application No. PCT/US2015/021124, 14 pages.
"AX ADC Application Delivery Controller," retrieved at <<http://www.a10networks.com/products/axseries_adc.php>> on Mar. 21, 2014, A10 Networks, San Jose, CA, 2 pages.
Das, Sujal, "Avoiding Network Polarization and Increasing Visibility in Cloud Networks Using Broadcom Smart-Hash Technology," retrieved at <<http://www.broadcom.com/collateral/wp/StrataXGS_SmartSwitch-WP200-R.pdf>>, Broadcom Corporation, Irvine, CA, Aug. 2012, 9 pages.
Patel et al., "Ananta: Cloud Scale Load Balancing," SIGCOMM'13, Aug. 12-16, 2013, Hong Kong, China, 12 pages.
Applicant-Initiated Interview Summary mailed Oct. 15, 2015 from U.S. Appl. No. 14/221,056, 5 pages.
Response filed Oct. 15, 2015 to Non-Final Office Action mailed Jul. 15, 2015 from U.S. Appl. No. 14/221,056, 14 pages.
PCT Demand filed Oct. 27, 2015 from PCT Patent Application No. PCT/US2015/021124, 19 pages.
Final Office Action mailed Nov. 30, 2015 to U.S. Appl. No. 14/221,056, 26 pages.
Response filed Dec. 9, 2015 to the Second Office Action mailed Sep. 24, 2015 from China Patent Application No. 201180017112.2, 12 pages.
Fourth Office Action and Search Report mailed Dec. 3, 2015 from China Patent Application No. 201080024662.2, 11 pages.
Office Action mailed Jun. 16, 2015 from Japan Patent Application No. 2012-513344, 6 pages.
Notice of Allowance mailed Nov. 23, 2015 from U.S. Appl. No. 12/753,913, 8 pages.
International Search Report and Written Opinion mailed Nov. 18, 2015 from PCT Patent Application No. PCT/US2015/047633, 13 pages.
Response filed Jan. 14, 2016 to the Examination Report mailed Sep. 23, 2015 from European Patent Application No. 10781357.8, 13 pages.
Response filed Feb. 8, 2016 to Final Office Action mailed Nov. 30, 2015 from U.S. Appl. No. 14/221,056, 14 pages.
Advisory Action, Examiner Initiated Interview Summary, and After Final Consideration Program Decision, mailed Mar. 1, 2016 from U.S. Appl. No. 14/221,056, 4 pages.
Office Action mailed Feb. 22, 2016 from Canada Patent Application No. 2,759,957, 5 pages.
Response filed Feb. 15, 2016 to the Preliminary Rejection mailed Dec. 13, 2015 from Korea Patent Application No. 10-2011-7028169, 16 pages.
Notice on Grant mailed Feb. 2, 2016 from China Patent Application No. 201080045182.4, 6 pages.
Response filed Feb. 17, 2016 to the Fourth Office Action mailed Dec. 3, 2015 from China Patent Application No. 201080024662.2, 13 pages.

Response to Telephone Interview filed Mar. 8, 2016 from China Patent Application No. 201080024662.2, 14 pages.
Notice on Grant mailed Feb. 25, 2016 from China Patent Application No. 201180017112.2, 7 pages.
Response filed Apr. 18, 2016 to the Office Action mailed Feb. 16, 2016 from Korea Patent Application No. 10-2011-7028254, 39 pages.
Non-Final Office Action mailed Feb. 16, 2016 from U.S. Appl. No. 14/475,927, 51 pages.
Office Action mailed Feb. 16, 2016 from Korea Patent Application No. 10-2011-7028254, 10 pages.
NEC ProgrammableFlow Technical Support, retrieved Jun. 16, 2014 at <<http://support.necam.com/pflow/legacy/p8800/>>, 1 page.
Response filed May 17, 2016 to the Non-Final Office Action mailed Apr. 7, 2016 from U.S. Appl. No. 14/221,056, 11 pages.
Second Written Opinion mailed Mar. 21, 2016 from PCT Patent Application No. PCT/US2015/021124, 7 pages.
Amendment/Response filed May 16, 2016 to the Non-Final Office Action mailed Feb. 16, 2016 from U.S. Appl. No. 14/475,927, 11 pages.
Response and Demand filed Mar. 3, 2016 from PCT Patent Application No. PCT/US2015/047633, 15 pages.
Non-Final Office Action mailed Apr. 7, 2016 from U.S. Appl. No. 14/221,056, 52 pages.
Notice on Grant mailed Mar. 23, 2016 from China Patent Application No. 201080024662.2, 7 pages.
Intention to Grant mailed May 20, 2016 from European Patent Application No. 10781357.8, 40 pages.
Response filed Apr. 12, 2016 to the Office Action mailed Feb. 22, 2016 from Canada Patent Application No. 2,759,957, 12 pages.
International Preliminary Report on Patentability mailed Jun. 15, 2016 from PCT Patent Application No. PCT/US2015/021124, 8 pages.
Final Office Action mailed Jun. 14, 2016 from Korea Patent Application No. 10-2011-7028169, 9 pages.
Response filed Jul. 15, 2016 to the Final Office Action mailed Jun. 14, 2016 from Korea Patent Application No. 10-2011-7028169, 21 pages.
International Search Report and Written Opinion mailed Jul. 13, 2016 from PCT Patent Application No. PCT/US2016/031079, 13 pages.
Office Action mailed Jul. 15, 2016 from Canada Patent Application 2,763,032, 5 pages.
Notice of Allowance mailed Jul. 20, 2016 from Korea Patent Application No. 10-2011-7028254, 8 pages.
Second Written Opinion mailed Jul. 21, 2016 from PCT Patent Application No. PCT/US2015/047633, 8 pages.
Final Office Action mailed Aug. 12, 2016 from U.S. Appl. No. 14/221,056, 31 pages.
Notice of Allowance mailed Aug. 16, 2016 from Korean Patent Application No. 10-2011-7028169, 8 pages.
Response filed Aug. 15, 2016 to the Examiner's Report mailed Jul. 15, 2016 from Canada Patent Application 2,763,032, 10 pages.
Non-Final Office Action mailed Aug. 26, 2016 from U.S. Appl. No. 14/475,927, 22 pages.
PCT Demand and Response filed Aug. 26, 2016 from PCT Patent Application No. PCT/US2016/031079, 20 pages.

* cited by examiner

AGILE DATA CENTER NETWORK ARCHITECTURE

PRIORITY

This patent application claims priority from U.S. Provisional Application No. 61/182,063, filed on 2009 May 28.

BACKGROUND

Conventional data center network architectures suffer from several design drawbacks which can undermine their agility (their ability to assign any server of a data center network to any service). First, the configurations of conventional networks are typically tree-like in nature and consist of relatively expensive equipment. This can result in congestion and the development of computational hotspots—even when spare capacity is available elsewhere in the network. Second, conventional data center networks do little to prevent a traffic flood in one service from affecting the other services around it. When one service experiences a traffic flood, it is common for all those services sharing the same network sub-tree to suffer collateral damage. Third, the routing design in conventional data center networks typically achieves scale by assigning servers topologically significant Internet Protocol (IP) addresses and dividing servers up among virtual local area networks (VLAN)s. However, this can create an enormous configuration burden when servers are reassigned among services, thus further fragmenting the resources of the data center. Furthermore, human involvement can typically be required in these reconfigurations, thus limiting the speed of this process. Finally, other considerations such as the difficulty in configuring conventional data center networks and the costs of equipment used in such networks can also negatively impact the agility of these networks.

SUMMARY

This patent application relates to an agile network architecture that can be employed in data centers, among others. One implementation provides a virtual layer-2 network connecting machines, such as servers of a layer-3 infrastructure.

Another implementation includes a plurality of computing devices communicatively coupled via a plurality of switches. Individual computing devices can be associated with an application address. An individual computing device can be configurable to act as a source and another individual computing device can be configurable to act as a destination. The source computing device can be configured to send a packet to the application address of the destination computing device. This implementation can also include an agile agent that is configured to intercept the packet and to identify a location address associated with the destination computing device and to select an individual switch through which to send the packet to the location address.

The above listed implementations are provided for introductory purposes and do not include and/or limit all of the claimed subject matter.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent application relates to an agile network architecture that can be employed in data centers, among others. Cloud services are driving the creation of huge data centers potentially holding tens to hundreds of thousands of servers. These data centers can concurrently support a large and dynamic number of distinct services (web apps, email, map-reduce clusters, etc.). The implementation of cloud service data centers can depend on a scale-out design: reliability and performance achieved through large pools of resources (e.g., servers) that can be rapidly reassigned between services as needed. The ability to assign any server of a data center network to any service can be considered the agility of a data center network. To effectively leverage the benefits of data centers, which can be associated with enormous costs, network agility can be valuable. Without network agility, data center server resources can be stranded, and thus money wasted.

First Example Agile Network Architecture

Figure 1:
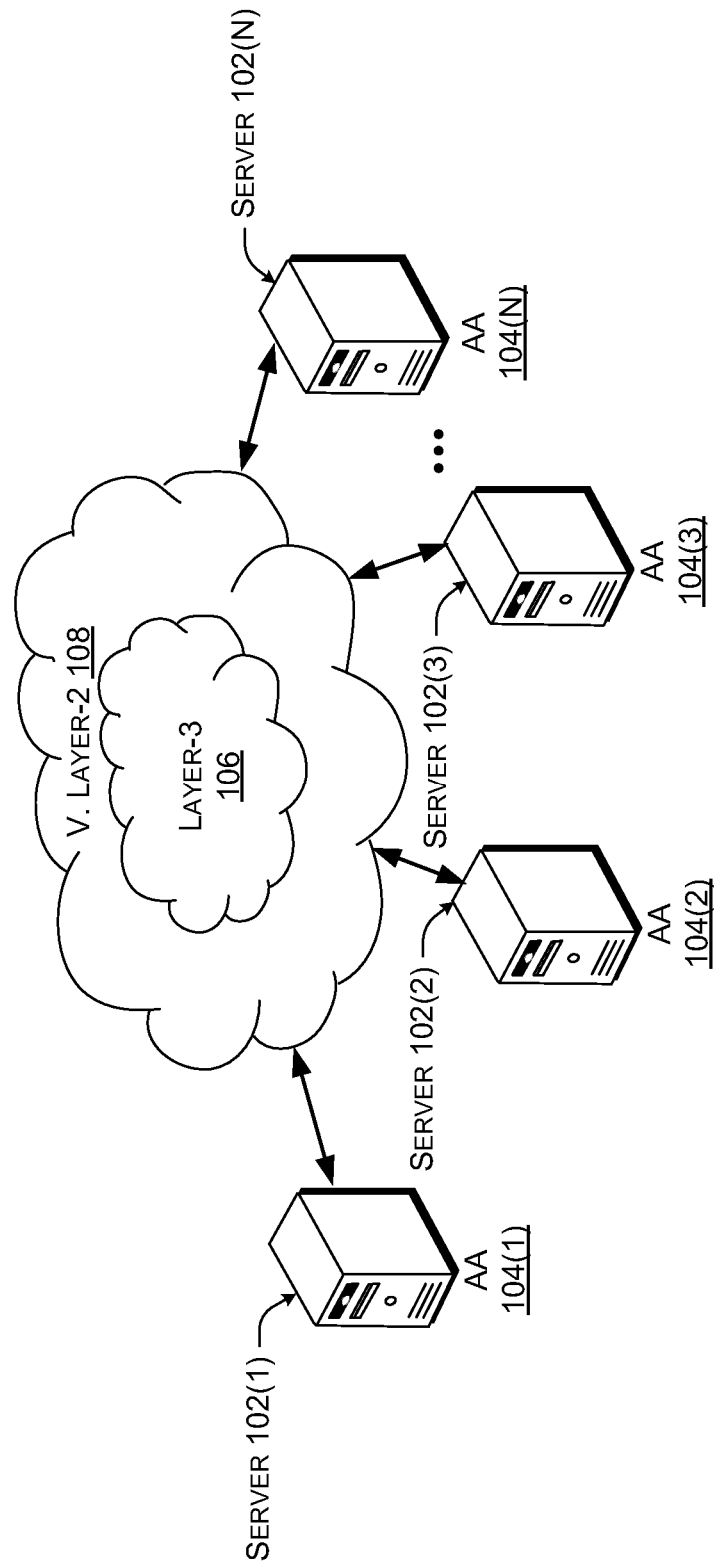
FIGS. 1-6 show examples of agile network architectures in accordance with some implementations of the present concepts.
Figure 2:
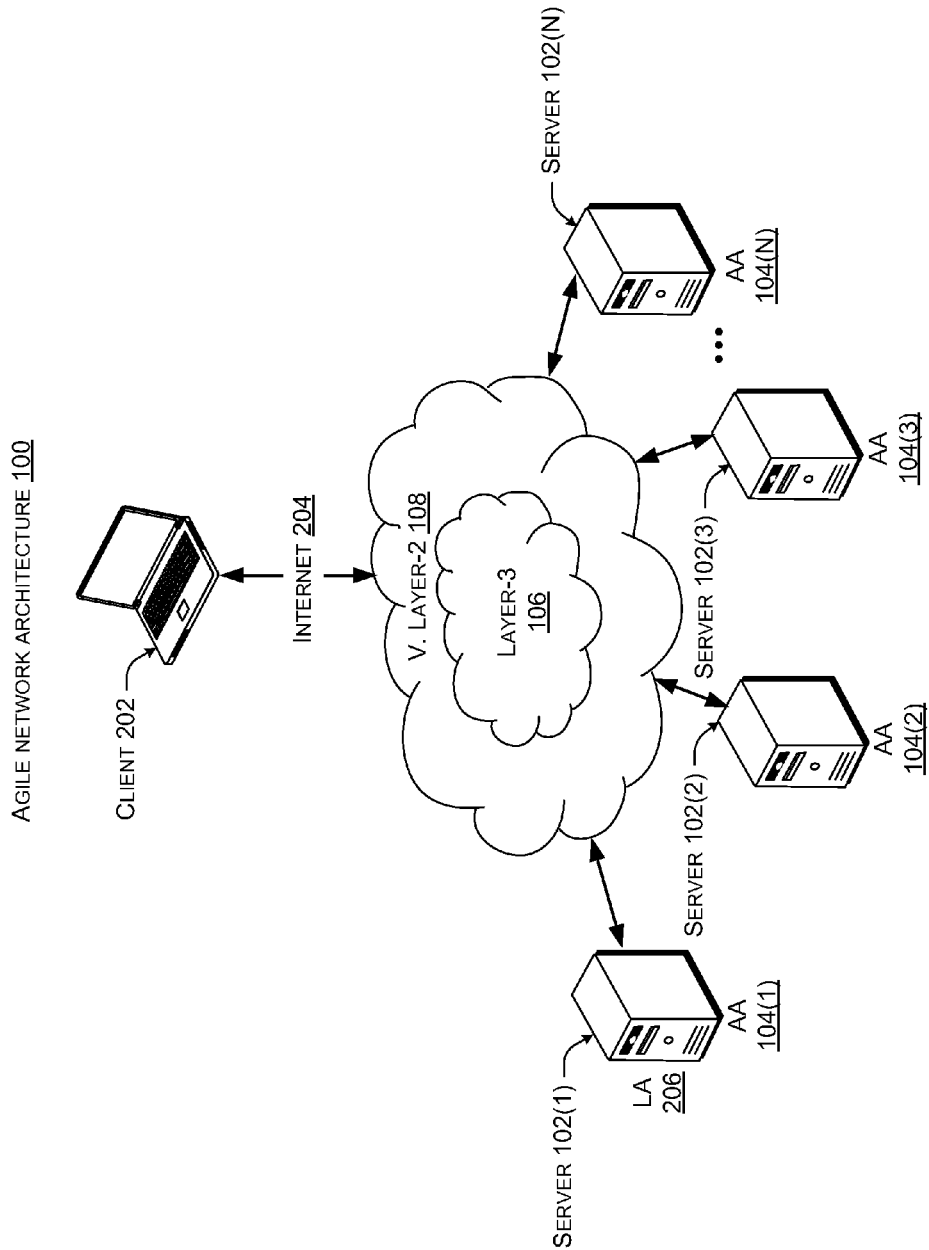

For introductory purposes consider FIGS. 1-2 which show examples of an agile network architecture 100. The agile data network architecture 100 can include a plurality of server-side computing devices, such as servers 102(1), 102(2), 102(3), and 102(N).

The terms server and machine should be understood to refer to any device that can send or receive data. For example, these terms should be understood to refer to any of: a physical server, a virtual machine that runs on a server (e.g., using virtualization technology), a computing device running a single operating system, a computing device running more than one operating system, computing devices running different operating systems (e.g., Microsoft Windows, Linux, FreeBSD), a computing device other than a server (e.g., a laptop, addressable power supply), or a portion of a computing device (e.g., a network attached disk, network-attach memory, a storage subsystem, a storage area network (SAN), a graphics processing unit, a numerical accelerator, a quantum computing device).

The agile network architecture 100 can promote scalability relative to the number of servers. One way that the scalability can be achieved is by creating Ethernet-like flat addressing for the servers 102(1)-102(N) utilizing application addresses. Ethernet layer-2 semantics can be associated with achieving a network state that supports flat addressing where any internet protocol (IP) address can be assigned to any server connected to any network port—as if the servers were on a local area network (LAN).

In this case, an application address (AA) 104(1), 104(2), 104(3), 104(N) can be assigned to each server 102(1), 102(2), 102(3), 102(N), respectively. From a server perspective, any server can talk to any other server via an associated application address 104(1), 104(2), 104(3), 104(N). This can be thought of as a layer-2 functionality, as the application addresses can be arranged in any fashion, including all those that would be valid for a Local Area Network (LAN) containing servers 102(1), 102(2), 102(3), 102(N). However, as will be explained below, in some implementations, the agile network architecture's underlying infrastructure may be layer-3 as indicated at 106. Thus, these implementations can create a virtual layer-2 network 108 upon (or utilizing) the layer-3 infrastructure 106. There can be more than one virtual layer-2 network 108 created upon the same layer-3 infrastructure 106, and each server can belong to one or more of these virtual layer-2 networks 108.

FIG. 2 introduces an external client 202 that is connected to agile network architecture 100 via the internet 204. The agile network architecture 100 can allow the external client to communicate with a global or location address 206 that is assigned to one or more of servers 102(1)-102(N) without the external client having knowledge of the application addresses 104(1)-104(N). These concepts are explained in more detail below in regards to the discussion of FIGS. 3-5.

Second Example Agile Network Architecture

Figure 3:
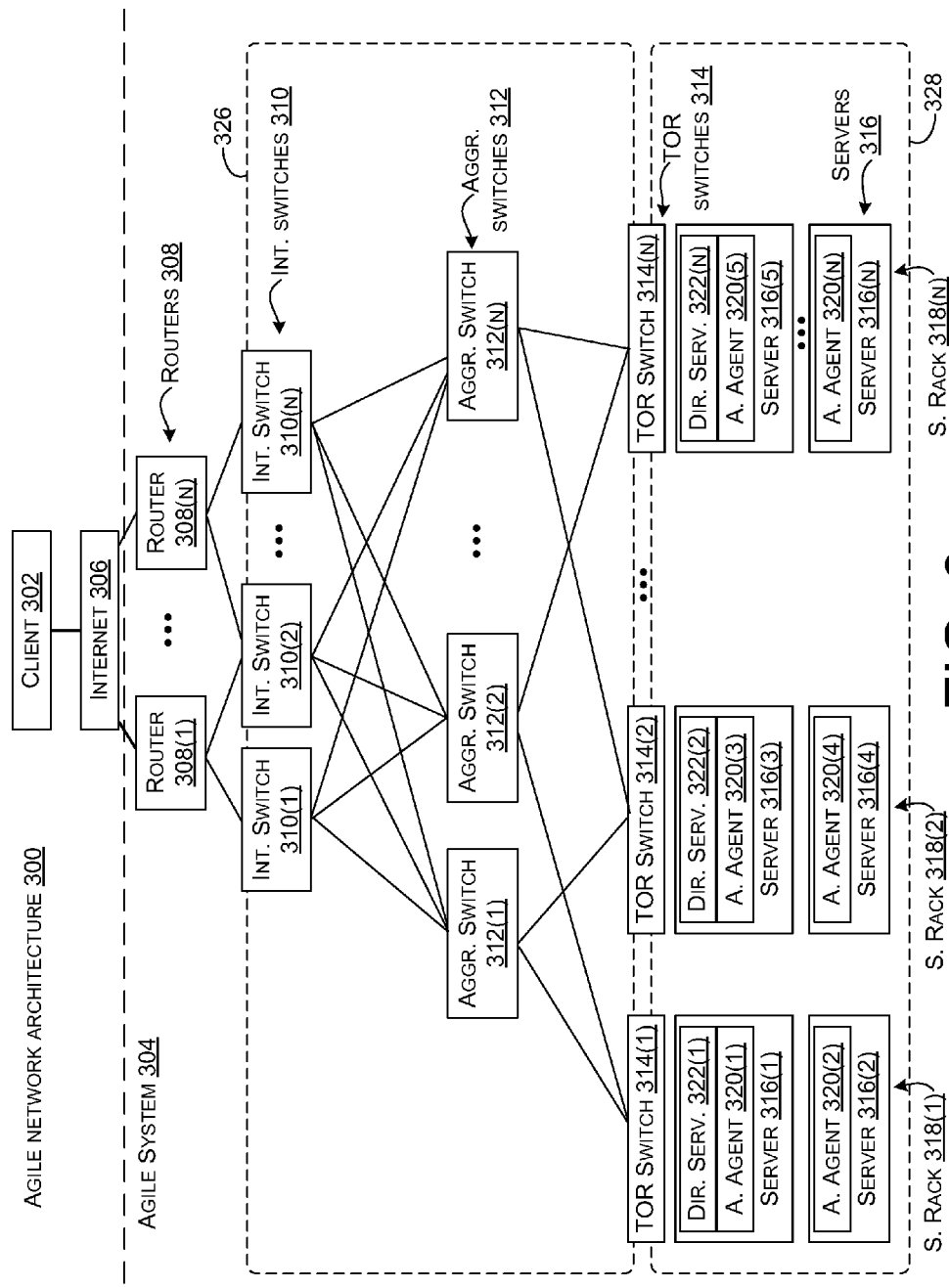

FIG. 3 shows an example agile network architecture 300 upon which the above described concepts can be implemented. In this case, an external client 302 can communicate with an agile system 304 via the internet 306 and/or other network. In this implementation, agile system 304 includes a set of routers indicated generally at 308 and indicated with specificity at 308(1) to 308(N), a plurality of intermediate switches indicated generally at 310 and indicated with specificity at 310(1), 310(2), and 310(N), a plurality of aggregation switches indicated generally at 312 and indicated with specificity at 312(1), 312(2), and 312(N), a plurality of top of rack (TOR or ToR) switches indicated generally at 314 and with specificity at 314(1), 314(2), and 314(N), and a plurality of servers indicated generally at 316 and with specificity at 316(1), 316(2), 316(3), 316(4), 316 (5), and 316(N). Due to space constraints of the drawings page, only six servers 316(1)-316(N) are illustrated here, but the agile system 304 can readily accommodate thousands, tens of thousands, hundreds of thousands, or more servers. Note that for sake of brevity and due to space constraints of the drawing page not all connections (i.e. communication paths) between components are illustrated in FIGS. 3-8.

Servers 316(1) and 316(2) are associated with TOR switch 314(1) as a server rack 318(1). Similarly, servers 316(3) and 316(4) are associated with TOR switch 314(2) as a server rack 318(2), and servers 316(5) and 316(N) are associated with TOR switch 314(N) as a server rack 318(N). Again, this is due to space constraints of the drawing page; often, server racks include ten or more servers. Further, individual servers can be associated with an agile agent. For instance, server 316(1) is associated with an agile agent 320(1). Similar relationships are shown between servers 316(2)-316(N) and agile agents 320(2)-320(N), respectively.

The function of the agile agents 320(1)-320(N) is described in more detail below. Briefly, the agile agents can facilitate communication between individual servers. In this particular instance, the agile agents can be thought of as logical modules stored upon the servers as computer-readable instructions. Other implementations can involve configurations where the agile agent 320 that serves a set of servers is located on a switch, for example a TOR switch 314 or an Intermediate switch 310. When located on a switch, the agile agent can process packets as they flow up the network from servers 316 towards the Intermediate switch 310. In such configurations the agile agent 320 might be implemented using a combination of custom hardware on the packet forwarding path and software instructions that execute in the forwarding path or in a control processor of the switch.

Agile system 304 further includes three directory service modules 322(1)-322(N). The illustrated number of directory service modules is not critical to the agile system and other implementations can employ fewer or more directory service modules (and/or other illustrated components). The function of the directory servers is discussed in more detail below. Briefly, the directory service modules can contain, among other information, application address-to-location address mappings (either or both forward and reverse mappings) that can be utilized by the agile agents 320(1)-320(N) (and/or other components) to facilitate communications over agile system 304. In this case, the directory service modules 322(1)-322(N) are associated with specific servers 316(1), 316(3), and 316(5). In other configurations, the directory service modules can occur with other components, such as data center control servers, switches, and/or on dedicated computing devices.

Agile system 304 can be thought of as containing two logical groupings. The first logical grouping is a link state network carrying location or global addresses as indicated at 326. The second logical grouping is a fungible pool of servers that own application addresses as indicated at 328. Briefly, components of the link state network 326 don't need to exchange information to track which server in the pool of servers 328 is currently using which application address. Also, from a server's perspective, a server can communicate with any other server in server pool 328 via the other server's application address. This process is facilitated by the agile agents, directory service, and/or other components in such a manner as to be transparent to the servers. Stated another way, the process can be transparent to applications running on the servers, though other components on the server may be aware of the process.

Routers 308, intermediate switches 310, aggregation switches 312, TOR switches 314 and servers 316(1)-316(N) can be communicatively coupled, such as using layer-3 technologies. From an individual server's perspective, communication with other servers appears as layer-2 communications (i.e., virtual layer-2). However, inter-rack communication, such as from source server 316(1) of server rack 318(1) to destination server 316(3) of server rack 318(2) actually occurs over the layer-3 infrastructure. For instance, agile agent 320(1) can intercept the communication (i.e., packet addressed to the application address of server 316(3)) and facilitate transmission thereof.

Agile agent 320(1) can access one or more of the directory service modules 322(1)-322(N) to obtain a mapping of an application address to a location address associated with server 316(3). For instance, the mapped location address may be to TOR switch 314(2). The agile agent can encapsulate the packet with the location address. The agile agent can then select an individual (or a set of) aggregation and/or intermediate switch(es) over which to send or bounce the encapsulated packet. Features of this selection process are described in more detail below. Upon receipt of the encapsulated packet at TOR switch 314(2), the TOR switch can de-capsulate the packet and send the packet on to server 316(3). In alternative embodiments, the location address might be associated with the server 316(3) or a virtual machine running on server 316(3), and the packet can be decapsulated on the destination server itself. In these embodiments, the location address assigned to the server or virtual machine might be hidden from other applications operating on the server so as to maintain the illusion to the applications that they are connected by a LAN on which the application address is the address other hosts use to communicate with them.

In alternative embodiments, the packets may be decapsulated by other components upon crossing the layer-3/layer-2 boundary. For instance, examples of components that can perform the decapsulation can include the hypervisor and/or the root partition of the virtual machine monitor.

This configuration can allow servers to be added to server pool 328 in great numbers, yet from the servers' perspective other servers can appear as though they are on the same sub-network. Alternatively or additionally, the components of the link state network 326 do not need to be aware of the server application addresses. Further, whenever address information changes, such as when a server is added or removed, the directory server(s) can simply be updated, rather than having to update multiple different types of components.

In summary, layer-2 semantics can be associated with achieving a network state that supports flat addressing where any IP address can be assigned to any server connected to any network port—as if the servers were on a LAN. Also, components (i.e., switches) in the link state network 326 can be aware of other components within the link state network but do not need to be aware of components of the server pool 328. Further, the TOR switches can know about the servers in their respective racks, but do not need to know about servers of other racks. Further still, agile agents can intercept server application address (AA) packets and identify a location address (LA) associated with the AA's destination computing device. The agile agent can then select an individual switch (or set of switches) through which to send the packet to the LA. In this case, the individual switch can include any one or more of the available switches.

This configuration also facilitates another server feature relating to service. For instance, data center management software, such as may be contained in the directory service modules 322(1)-322(N), can assign any server 316(1)-316(N) to any service and configure that server with whatever IP address the service expects. The network configuration of each server can be identical to what it would be if connected via a LAN, and features such as link-local broadcast can be supported. The objective of communication isolation between services can be associated with providing an easy and consistent application program interface (API) for defining services and communication groups. In this regard, the directory service can define groups of servers associated with a service (e.g., a customer). Full connectivity can be permitted between servers in a group, and policies such as Access Control List (ACL) may be specified for governing which servers in different groups should be allowed to communicate.

The above configuration further lends itself to traffic management. For purposes of explanation, assume that a first customer pays a relatively high rate for services to be performed by servers of agile system 304 and accordingly gets a relatively high quality of service agreement. Further, assume that a second customer pays a relatively lower rate and accordingly receives a relatively lower quality of service agreement. In such a case, a relatively high percentage, or all, of the intermediate switches 310(1)-310(N) can be assigned to handle traffic for the first customer, while a smaller number of the switches can be assigned to the second customer. Stated another way, a first sub-set of the switches can be assigned to the first customer and a second sub-set of the switches can be assigned to the second customer. The first and second sets can be mutually exclusive or overlapping. For instance, in some implementations, individual switches can be dedicated to a particular customer or assigned to multiple customers. For example, intermediate switch 310(1) can be assigned to both of the customers, while intermediate switches 310(2) and 310(N) can be exclusively assigned to the first customer.

To summarize, and as will be explained in more detail below, the agile network architecture 300 can be associated with one or more of the following objectives: uniform high capacity between servers, performance isolation between services, Ethernet layer-2 semantics, and/or communication isolation between services. An objective of a uniform high capacity between servers can be associated with achieving a network state where the rate of traffic flow in the network is primarily unlimited except by the available capacity on the network interface cards of the sending and receiving servers. As such, from a developer's perspective, by achieving this objective, network topology may no longer be a primary concern when adding servers to a service. The objective of performance isolation between services can be associated with achieving a network state where the traffic of one service is unaffected by the traffic handled by any other service—as if each service was connected by a separate physical switch. An objective of Ethernet layer-2 semantics can be associated with achieving a network state that supports flat addressing where almost any IP address can be assigned to any server connected to any network port—as if the servers were on a LAN. As such, data center management software can assign any server to any service and configure that server with whatever IP address the service expects.

The network configuration of each server can be identical to what it would be if connected via a LAN, and features such as link-local broadcast can be supported. The objective of communication isolation between services can be associated with providing an easy and consistent API for defining services and communication groups. In this regard, a directory system (i.e., via for instance, directory service modules 322(1)-322(N)) defining groups of servers can be provided. Full connectivity can be permitted between servers in a group, and policies may be specified for governing which servers in different groups should be allowed to communicate.

By utilizing the described agile network architecture, a data center network can be provided that is associated with one or more of the following network characteristics: (1) flat addressing to allow service instances to be placed anywhere in the network, (2) load balancing (e.g., valiant load balancing (VLB)) that uses randomization to spread traffic uniformly across network paths, and (3) a new end system based address resolution service to achieve layer-2 Ethernet semantics while scaling to large server pools.

To achieve the above-noted objectives, in at least some embodiments, one or more of the following agile network architectural design principles can be employed in various implementations.

Utilizing a Topology with Extensive Path Diversity

By utilizing a "meshy" topology, multiple paths between individual sets of servers can be provided. For instance, communications between servers of server rack 318(1) and servers of server rack 318(N) may go from TOR switch 314(1) through any of aggregation switches 312(1)-312(2) to any of intermediate switches 310(1)-310(N). From the intermediate switch the communication can go through either of aggregation switches 312(2)-312(N) to TOR switch 314(N).

This configuration can result in several benefits. For example, the presence of multiple paths can enable reduction and/or elimination of congestion from the network without the need for explicit traffic engineering or the tuning of parameters. Further, multiple paths allows for a "scale-out" network design. In other words, more capacity can be added by adding more low cost switches. In contrast, the conventional hierarchical network designs concentrate traffic in one or a very few links at higher levels of the hierarchy. As a result, conventional networks may require the purchase of expensive "big iron" switches to cope with the high density of traffic.

Further still, by utilizing the "meshy" topology, the multiple paths can allow for graceful degradation as links or switches fail. For example, an agile network implemented according to the described agile data center network architecture with "n" switches at a given layer may lose only 1/n of its capacity when a switch fails, as compared to a conventional network that may lose 50% of its capacity. An agile network implemented according to the described agile data network architecture can potentially utilize the complete bipartite topology.

Randomizing to Address Volatility

Data centers can have tremendous volatility in their workload, their traffic, and their failure patterns. Accordingly, large pools of resources can be created. Work can then be spread over them randomly; some performance on the best-cases can be traded off to improve the worst-case to the average case. In at least some embodiments, a topology (e.g., for example as evidenced in FIG. 3) associated with an extensive path diversity can be utilized. Work flows can be routed across the topology using a load balancing technique, such as a Valiant Load Balancing (VLB) technique. Briefly, VLB techniques can involve randomly selecting the path or paths used to carry a data transmission, where a path is composed of a series of links and or switches. Subsequently, the path can be reselected, where reselection entails changing one or more of the switches or links that comprise the original path. The reselection can occur periodically, such as after sending/receiving a specified number of bytes/packets, and/or responsively upon indication of transmission problems associated with the selected path, switch, or link. For instance, if packet delay or other communication impairment is detected, then the selection process can be repeated. Through application of this principle the uniform capacity and performance isolation objectives can be met.

More particularly, to address volatility and uncertainty in data center traffic matrices, the load balancing technique (e.g., VLB) can be utilized to hash flows randomly across network paths. An objective to this approach can be to provide bandwidth guarantees for arbitrary traffic variation subject to network ingress-egress constraints as in the hose traffic model. Briefly, the hose model specifies that data transmission rates over a given path cannot exceed a slowest or most constrained portion of the path.

Using a load balancing technique like VLB at the flow granularity (meaning that most packets of a flow follow the same path through the network except when reselecting paths) can be advantageous, as it can reduce the chances that the packets of a flow will be reordered or experience rapidly changing latency perceived at the destination, and/or disrupt operations of path Maximum Transmission Unit (MTU) discovery protocols due to MTU differences within a flow. Some types of traffic (e.g., those not harmed by packet reordering) and some environments (e.g., those with very uniform delays along all paths) may prefer to use load balancing like VLB at a packet granularity (meaning that potentially different paths are used for each packet in a sequence of packets). Any of the commonly accepted definitions of flow can be used, for example: an IP 5-tuple flow, an IP 2-tuple flow, or the set of packets between two subnets or address ranges.

In the context of providing an agile data center network, the ingress-egress constraints can correspond to server line card speeds. In combination with a high bisection bandwidth topology (e.g., a folded Clos topology), the load balancing technique can be utilized to create a non-interfering packet switched network (the counterpart of a non-blocking circuit switched network) and provide hot-spot-free performance for traffic patterns that do not have sustained loads exceeding server ingress-egress port speed. In this regard, in some implementations, the Transmission Control Protocol's (TCP) end-to-end congestion control mechanism can be utilized to enforce the hose model and avoid over-running server port speeds. This principle can lead to the logical topology illustrated in FIG. 3, which can consist of three different layers of switches: TOR 314, Aggregation 312, and Intermediate 310. A flow from one server to another can take a random path via a random intermediate switch, across TORs and Aggregation switches. A load balancing technique, such as VLB, can thus be utilized in the context of inter-switch fabric of a data center to smooth utilization while eliminating persistent traffic congestion.

Separating Names From Locations

Separating names from locations can create a degree of freedom that can be used to implement new features. This principle can be leveraged to enable agility in the data center networks and to improve utilization by reducing fragmentation that the binding between addresses and locations can cause. Through the application of this principle and the principle of embracing end systems described below, layer-2 semantics objectives can be met. As such, developers can be allowed to assign IP addresses without regard for the network topology and without having to reconfigure their applications or the network switches.

To enhance network agility (supporting any service on any server, dynamic growing and shrinking of server pools, and workload migration), an IP addressing scheme can be used that separates names, termed AAs, and locators, termed LAs. An agile directory service, such as can be manifest as directory service modules 322(1)-322(N), can be defined to manage the mappings between AAs and LAs in a scalable and reliable fashion. The agile directory service can be invoked by a shim layer running in the networking stack on individual servers. In the implementation represented in FIG. 3, this shim layer can be manifested as agile agents 320(1)-320(N).

Embracing End Systems

Software, including operating systems, on data center servers is typically extensively modified for use inside the data center. For example, new or modified software can create hypervisors for virtualization or blob file systems to store data across servers. Rather than altering software on switches, the programmability of this software can be leveraged. Furthermore, changes to the hardware of the switches or servers can be avoided or limited and legacy applications can remain unmodified. By using software on the servers to work within limitations of the low-cost switch application-specific integrated circuits (ASICs) currently available, a design can be created that can be built and deployed today. For example, the scalability problems created by broadcast Address Resolution Protocol (ARP) packets can be reduced and/or eliminated by intercepting ARP requests on the servers and converting them into lookup requests to a directory system, rather than attempting to control ARPs via software or hardware changes on the switches.

Figure 4:
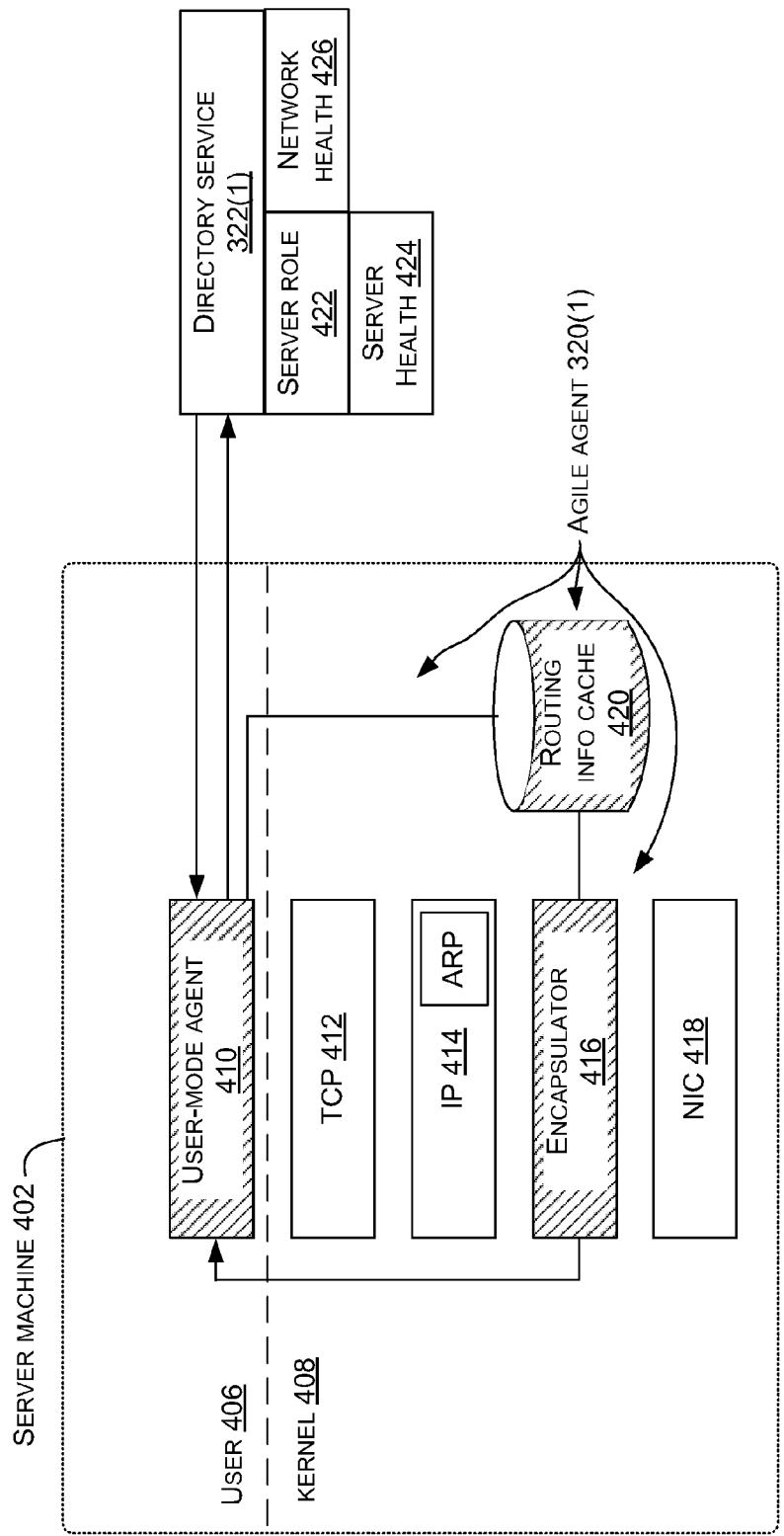

FIG. 4 shows an example agile agent 320(1) in more detail. In this case, agile agent 320(1) operates on a server machine 402 that includes a user mode 406 and a kernel mode 408. The server machine includes a user-mode agent 410 in the user mode. The kernel mode includes a TCP component 412, an IP component 414, an encapsulator 416, a NIC 418 and a routing information cache 420. The server machine can include and/or communicate with directory service 322(1). The directory service can include a server role component 422, a server health component 424, and a network health component 426. Agile agent 320(1) can include the user-mode agent 410, encapsulator 416, and routing information cache 420. Encapsulator 416 can intercept ARP and send it to the user-mode agent 410. The user mode agent can query the directory service 322(1). It should be understood that other arrangements of these blocks are possible, such as including the user mode agent into a kernel mode component or invoking the directory lookup via a mechanism other than ARP, such as during routing table lookup or via mechanisms such as IP tables or IP chains.

In the agile network architecture of FIG. 3, an end-system control can provide a mechanism to rapidly inject new functionality. As such, the agility agent can provide a fine grained path control by controlling the randomization used in load balancing. In addition, to realize the separation of names and locators, the agile agent can replace Ethernet's ARP functionality with queries to the agile directory service. The agile directory service itself can be realized on servers, rather than switches. This agile directory service allows fine grained control of server reachability, grouping, access control, resource allocation (e.g., capacity of intermediate switches), isolation (e.g., non-overlapping intermediate switches), and dynamic growing and shrinking.

Leveraging Network Technologies

Utilizing one or more network technologies that have robust implementations in network switches can simplify the design of an agile network and increase operator willingness to deploy such a network. For example, in at least some embodiments, link-state routing protocols may be implemented on network switches to hide certain failures from servers and also can be leveraged to help reduce the load on the agile directory service. These protocols may be utilized to maintain the topology and routes for the agile network, which can reduce coupling between the agile directory service and the network control plane. Through a routing design that defines anycast addresses on the switches, the described agile architecture can leverage Equal Cost Multi-Path (ECMP) to hide the failure of switches from servers. This can further reduce the load on the directory system. Other routing protocols that support the use of multiple paths are also suitable.

Implementation Details Regarding Virtual Layer Two Networking Examples

Scale-Out Topologies

Conventional networks typically concentrate traffic into a few switches at the highest levels of the network. This can both restrict the bisection bandwidth to the capacity of these devices and significantly impact the network when they fail. However, to avoid these problems, an agile network topology driven by the principle of using randomization for coping with traffic volatility can be utilized. In this regard, an approach of scaling out network devices can be taken. This can result in a relatively broad network of low complexity switches, as illustrated in FIG. 3, that can be dedicated to fast forwarding. This is an example of a folded Clos network where the links between the intermediate switches 310(1)-310(N) and the aggregation switches 312(1)-312(N) can form a complete bipartite graph. As in conventional topology, TORS can connect to two aggregation switches. However the large number of paths between any two aggregation switches means that if there are n intermediate switches, the failure of any of them reduces the bisection bandwidth by only 1/n—a desirable property that can be referred to as graceful degradation of bandwidth. Further, networks such as Clos networks can be designed so that there is no oversubscription. For example, in FIG. 3, aggregation and intermediate switches having a count of D interface ports can be used. These switches can be connected such that the capacity between each layer of switches is $D*D/2$ times the link capacity.

Networks, such as Clos networks, can be exceptionally well suited for load balancing (e.g., VLB) in that by bouncing through an intermediate switch at the top tier or "spine" of the network, the network can provide bandwidth guarantees for potentially all possible traffic matrices subject to ingress-egress bounds at server line cards. Routing can be simple and resilient (e.g., a random path can be taken up to a random intermediate node and a random path taken down).

The described agile architecture can provide greater path control than can be achieved with conventional network architectures. More particularly, intermediate nodes can be partitioned, and traffic classes dedicated to different partitions to allocate higher overall bandwidth to some traffic classes. Congestion indications can be signaled back to senders through Explicit Congestion Notification (ECN) or similar mechanisms, as in the Institute of Electrical and Electronics Engineers (IEEE) 802.1 Qau congestion control. As such, a sender that accumulates ECN signals could respond by varying the fields in the source packet used to choose alternative paths through the network (referred to as reselecting a path above).

Agile Routing

To implement the principle of separating names from locators, an agile network can use two IP address families. FIG. 3 illustrates such a separation. The network infrastructure can work in terms of LAs. Switches and interfaces (310(1)-310(N), 312(1)-312(N), and 314(1)-314(N), can be assigned LAs. The switches can run a link state IP routing protocol that carries these LAs.

Applications, such as those running on servers 316(1)-316(N), can be unaware of LAs but aware of AAs. This separation can be associated with several benefits. First, packets can be tunneled to an appropriate LA rather than sent directly to an AA (the switches do not need to maintain a routing entry per host to deliver them). This means the agile directory service, which converts AAs to LAs, can implement policies regarding which services should be allowed to communicate. Second, low-cost switches often have small routing tables (e.g., 12K entries) that can hold all LA routes, but would be overwhelmed by the number of AAs. This concept can be especially valuable in that it can allow a network to be built that is bigger than the number of routing entries the switches can hold. Third, the separation enables agility since any AA can be assigned to any server without regard for topology. Fourth, the freedom to assign LAs separately from AA means that LAs can be assigned in such a manner as they can be summarized in a topologically significant fashion, further limiting the amount of routing state the switches must carry, while not impeding the ability to assign application addresses in whatever fashion is desired by the services running inside the data center or the data center's operators.

Alternative embodiments of the invention might use other types of data for LA and AA addresses. For example, LA addresses could be IPv4 and AA addresses could be IPV6, or vice versa, or IPV6 address could be used for both AA and LA addresses, or IEEE 802.1 MAC addresses could be used as AA addresses while IP addresses (v4 or v6) are used for LA addresses, or vice versa, etc. Addresses can also be created by combining together different types of addresses, such as a VLAN tag or VRF identifier with an IP address.

The following discussion explains how the topology, routing design, agile agent, and agile directory service can be combined to virtualize the underlying network fabric and create an illusion to servers 316(1)-316(N) of the agile network that they are connected to other servers 316(1)-316(N) of their group in a layer-2 LAN, and anything above it, and that the host is part of a relatively large data center-wide layer-2 LAN.

Address Resolution and Packet Forwarding

In at least some implementations, to enable servers 316(1)-316(N) to believe they share a single large VLAN with other servers in the same service while eliminating the broadcast ARP scaling bottleneck that can plague large Ethernets, the below mentioned solutions are provided. Preliminarily, it should be noted that the following solutions can be backwards compatible and transparent to existing data center applications.

Packet Forwarding

AAs typically may not be announced into the routing protocols of the network. Accordingly, for a server to receive a packet, the packet's source can first encapsulate the packet, setting the destination of the outer header to the LA for the host. Upon reaching the device holding the LA address, the packet is decapsulated and delivered to the destination server. In one embodiment, the LA for a destination server is assigned to the TOR under which the destination server is located. Once the packet arrives at its destination TOR, the TOR switch can de-capsulate the packet and deliver it based on the destination AA in the inner header, according to normal layer-2 delivery rules. Alternatively, an LA can be associated with the physical destination server or a virtual machine running on the server.

Address Resolution

Servers can be configured to believe that AA addresses are in the same LAN as them, so when an application sends a packet to an AA for the first time, the kernel network stack on the host can generate a broadcast ARP request for the destination AA. The agile agent running in the source server's networking stack can intercept the ARP request and convert it to a unicast query to the agile directory service. When the agile directory service answers the query, it can provide the LA to which packets should be tunneled. It can also provide the intermediate switch or set of intermediate switches that can be used to bounce the packets.

Inter-Service Access Control by Directory Service

Servers may be unable to send packets to an AA if they cannot obtain the LA of the TOR to which they must tunnel packets for the AA. Accordingly, agile directory service 322(1)-322(N) can enforce communication policies. When handling a lookup request, the agile directory service knows which server is making the request, the service to which both source and destination belong, and the isolation policy between those services. If the policy is "deny", the agile directory service can simply refuse to provide the LA. An advantage of the described agile network architecture is that when inter-service communication is allowed, packets can flow directly from sending server to receiving server, without being detoured to an IP gateway. This is unlike the connection of two VLANs in conventional architectures.

Interaction with the Internet

Often, approximately 20% of the traffic handled by data centers can be to or from the Internet. Therefore, it is advantageous for a data center network to be able to handle these large volumes. While it might at first seem strange that the described agile network architecture utilizes a layer-3 fabric to implement a virtual layer-2 network, one advantage of this is that external traffic can flow directly across the high-speed silicon of the switches that can make up an agile data center network with this architecture without being forced through gateway servers to have their headers rewritten, as required in some conventional and proposed network environments.

Servers that need to be directly reachable from the Internet (e.g., front-end web servers) can be assigned two addresses: an LA and an AA. The LA can be used for internetwork communications. The AA can be used for intra-data-center communications with back-end servers. The LA can be drawn from a pool that is announced via Border Gateway Protocol (BGP) and that is externally reachable. Traffic from the Internet can then directly reach the server. Packets from the server to external destinations can be routed toward the core routers while being spread across the available links and core routers by ECMP.

Handling Broadcasts

The described agile network architecture can provide layer-2 semantics to applications for backwards compatibility. This can include supporting broadcast and multicast. The agile network architecture's approach is to eliminate the most common sources of broadcast completely, such as ARP and the Dynamic Host Configuration Protocol (DHCP). ARP can be handled by intercepting ARP packets in the agility agent 320 and providing a response after consulting information from the agile directory service as described above, and DHCP packets can be intercepted at the TOR using conventional DHCP relay agents and unicast forwarded to DHCP servers. To handle other broadcast packets, each set of hosts that should be able to receive broadcast packets sent by other hosts in that set can be assigned an IP multicast address. This address can be assigned by the directory system and agility agents can learn it by querying the directory system.

Packets sent to the broadcast address can be modified to go to the service's multicast address instead. The agile network architecture's agile agent can rate limit broadcast traffic to prevent storms. The agile agent can maintain an estimate of the rate of broadcast packets the server has sent over recent time intervals (e.g., the past 1 second and past 60 seconds), and prevent the server from sending more than a configured number of broadcast packets during each interval. Packets sent in excess of the allowed can be either dropped or delayed until the next interval. Native IP multicast can also be supported.

A potential advantage of embodiments where the switches operate as layer-3 routers is that implementing the delivery of packets addressed to a multicast group to all hosts or machines belonging to the multicast group is particularly easy. Any of the existing IP multicast routing protocols, such as PIM-BIDIR, can be configured onto the switches. This will cause them to compute a multicast distribution tree with endpoints at each host or machine belonging to a multicast group. The agility agent on the host, machine, or server registers the host, machine, or server as being part of the appropriate multicast groups, typically by sending IGMP join messages to its default gateway. The multicast routing protocols will then take care of adding the host, machine, or server to the distribution tree for that multicast group. Switches that operate at layer-2 can use a variety of mechanisms, such as a VLAN per multicast group, or flood filling packets through the network, with the agility agent on each host, machine, or server filtering out the packets that the agent's host, machine or server should not receive.

Randomization with Multi-Path Routing

The described agile network architecture can leverage/utilize the principle of using randomization to cope with volatility using, in at least some embodiments, two related mechanisms: VLB and Equal Cost Multipath (ECMP). The goals of both are similar—VLB distributes traffic randomly across intermediate nodes and ECMP sends traffic across equal cost paths so as to reduce or prevent persistent congestion. As explained in more detail below, VLB and ECMP can be complementary in that each can be used to overcome limitations in the other. Both mechanisms can provide controls that a packet's sender can use to influence the choice of paths across the network. The agile agent allows for these controls to be leveraged to avoid congestion.

Figure 5:
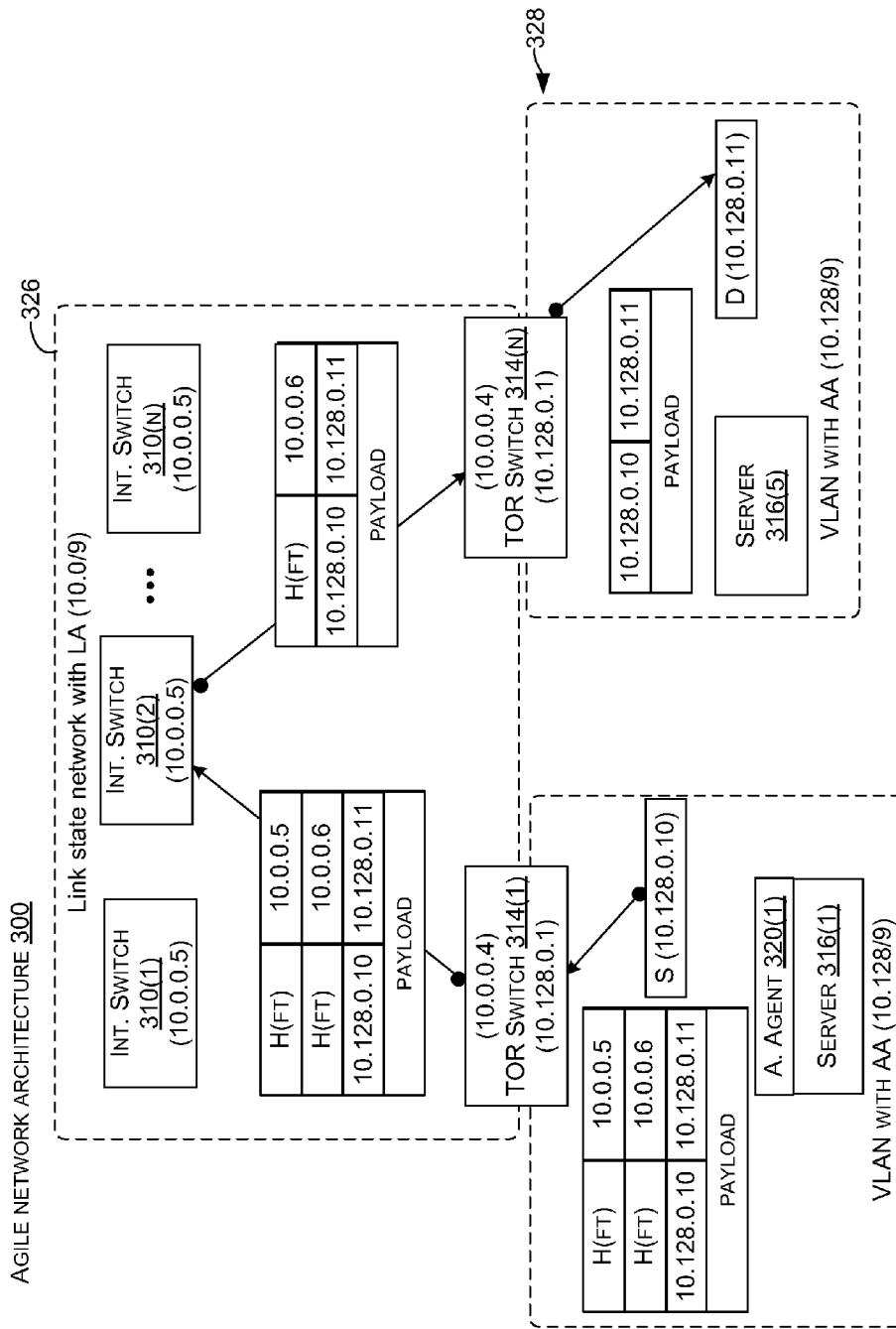
Figure 6:
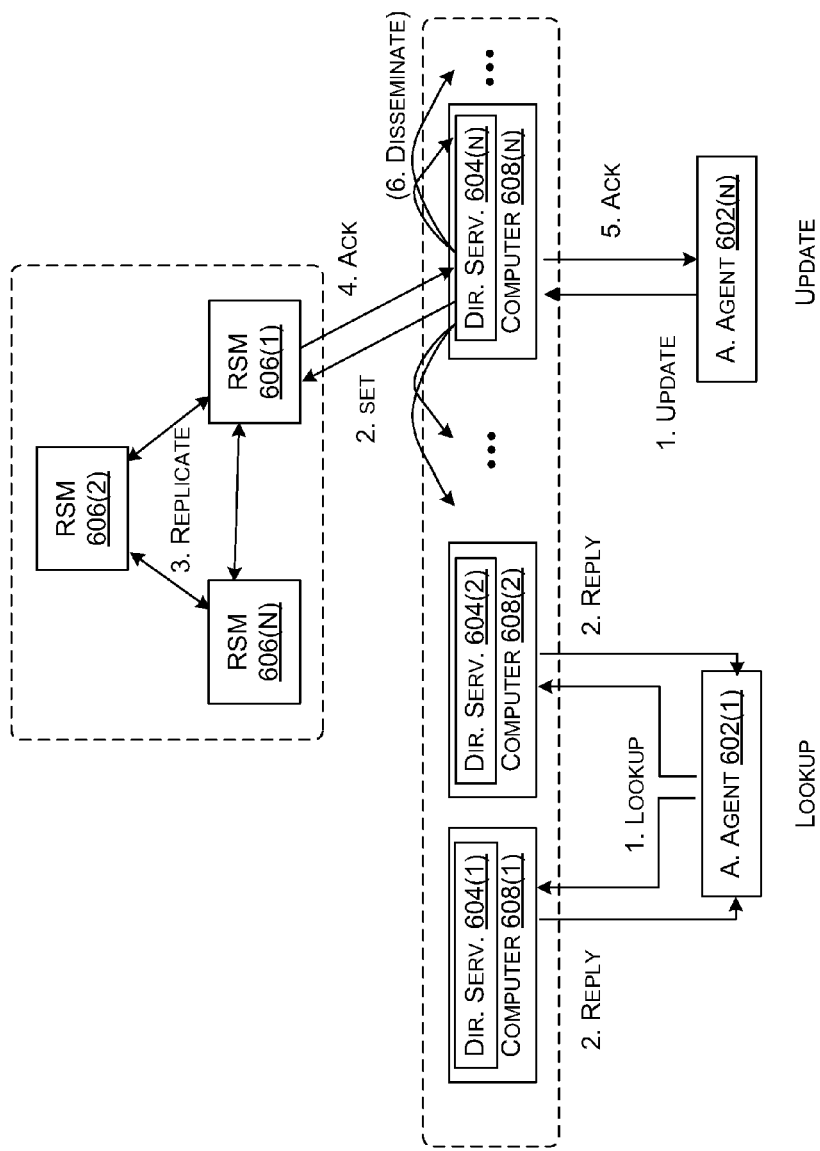

FIG. 5 illustrates a sub-set of the agile network architecture 300 that was introduced in FIG. 3. FIG. 5 offers further detail in server to server communications. This example involves server 316(1) communicating with server 316(5). Sending server 316(1) and destination server 316(5) can function in server pool 328 that functions as a VLAN and have an application address of 10.128/9. Intermediate switches 310(1)-310(N) reside in link state network 326.

Agile network architecture 300 can allow the benefits of VLB to be accomplished by forcing packets to bounce off a randomly chosen intermediate node. In this case, the sender's agile agent 320(1) can implement this by encapsulating each packet to an intermediate switch 310(1)-310(N). The intermediate switch tunnels the packet to the destination's TOR (in this case 314(N)). Hence the packet can first be delivered to one of the intermediate switches, such as 310(2), decapsulated by the switch, delivered to the LA of TOR 314(N), decapsulated again and finally sent to the destination server 316(5).

If the agile agent 320(1) knew the addresses of the active intermediate switches 310(1)-310(N), it could randomly choose among them when sending packets. However, this could require updating potentially hundreds of thousands of agile agents as intermediate switches fail. Instead, the same LA address can be assigned to multiple intermediate switches (in this case LA address 10.0.0.5). The agile directory service (shown FIG. 3) can return this anycast address to agile agent 320(1) as part of one or more lookup results. ECMP can take care of delivering packets encapsulated to the anycast address to one of the active intermediate switches 310(1)-310(N). If a switch fails, ECMP can react, eliminating the need to notify agile agents.

ECMP, however, may have scaling limitations. Conventional switches today can support 16-way ECMP, and 256-way ECMP switches may also be available or may soon be available. If there happen to be more paths available than ECMP can use, then VLB encapsulation can compensate. One solution is to define several anycast addresses, individual anycast addresses being associated with as many intermediate switches 310(1)-310(N) as ECMP can accommodate. Senders can hash across the anycast addresses to distribute the load, and, as switches fail, the anycast addresses can be reassigned to other switches by the directory system so that individual servers do not need to be notified. For purposes of explanation, this aspect can be thought of as a network control functionality offered by the directory system.

The described VLB based oblivious routing can be implemented using pure OSPF/ECMP mechanisms on folded-close network topology. Such a configuration does not need decapsulation support at the intermediate switches. For instance, if N is the number of uplinks on each TOR, then the aggregation switches can be grouped into sets. In some cases, each of these sets can contain exactly N switches. Each TOR can have an uplink to all N switches in a set, or to none of the switches in a set. With this wiring of the TORS, it can be shown that the bandwidth guarantees for arbitrary traffic subject to server ingress/egress constraints continue to hold even when protocols like OSPF and/or ECMP are used for routing between TORS.

The use of OSPF or ECMP for routing between TORS can cause some packet(s), such as packets between two TORS in the same set of aggregation switches, to take a path that does not go through the intermediate switches. Thus, these paths can be termed "early turnaround paths" as they follow the shortest path between source and destination and allow early turnaround of traffic between servers under the same TOR or under TORS connected to the same aggregation switch or switches. These traffic flows do not need to enter the core aggregation/intermediate network.

Potential benefits of using early-turnaround paths can include freeing up capacity in the core for other classes of traffic (e.g., external). The capacity freed could be substantial for the "average" case when existing applications have been written to minimize cross-TOR traffic, for example. Viewed another way, this can allow the core to be under-provisioned by some factor and still work just as well for server-to-server traffic. The use of early-turnaround paths can also allow wider range of devices to be used as Intermediate switches, resulting in lower costs for those switches.

Coping with Congestion

With both ECMP and VLB, there may be a chance that large flows will be hashed to the same links and intermediate switches respectively, which may cause congestion. If this should occur, the sending agile agent can change the path its flows take through the agile network by altering the value of the fields that ECMP uses to select a next-hop, that is, the next switch through which the packet should pass. In this regard, an agile agent can detect and deal with such situations with simple mechanisms, such as rehashing the large flows periodically or when a severe congestion event (e.g., a full window loss) or an Explicit Congestion Notification is detected by TCP or after sending/receiving a threshold number of bytes/packets.

Maintaining Host Information

A network system implemented according to the described agility network architecture can use a scalable, reliable, and/or highly performant store or directory system designed for data center workloads. A network implemented according to the agility network architecture can possess one or more of these four properties: uniform high capacity, performance isolation, L-2 semantics, and communication isolation between services. The network can also exhibit graceful degradation, where the network can continue to use whatever capacity remains after a failure. As such, the network can be reliable/resilient in the face of failures. In this regard, a directory system in such a network can provide two potentially key functionalities: (1) lookups and updates for AA-to-LA mappings, and (2) a reactive cache update mechanism that can support latency-sensitive operations, such as live virtual machine migration, for example.

Characterizing Requirements

A lookup workload for a directory system can be frequent and bursty. Servers can communicate with up to thousands or tens of thousands of other servers in a short time period with each flow generating a lookup for an AA-to-LA mapping. For updates, the workload can be driven by failures and server startup events. Many failures are typically small in size, and large correlated failures are likely rare.

Performance Requirements

The bursty nature of workload implies that lookups may require high throughput and low response time to quickly establish a large number of connections. Since lookups increase the time required to communicate with a server for the first time, the response time should be kept as small as possible: for instance, tens of milliseconds is a reasonable value. For updates, however, a potentially key requirement can be reliability, and response time may be less critical. Further, since updates are typically scheduled ahead of time, high throughput can be achieved by batching updates.

Consistency Considerations

In a conventional Layer-2 network, ARP can provide eventual consistency due to ARP timeout. In addition, a host can announce its arrival by issuing a gratuitous ARP. As an extreme example, consider live virtual machine (VM) migration in a network implemented according to the described agility network architecture. VM migration can utilize fast update of stale mappings (AA-to-LA). A potential goal of VM migration can be to preserve on-going communications across location changes. These considerations imply that weak or eventual consistency of AA-to-LA mappings can be acceptable as long as a reliable update mechanism can be provided.

Agile Directory System or Service Design

Performance parameters and workload patterns of lookups can differ significantly from those of updates. As such, consider the two-tiered agile directory service architecture 600 illustrated in FIG. 6. In this case, the agile directory service architecture 600 includes agile agents 602(1)-602(N), directory service modules 604(1)-604(N), and replicated state machine (RSM) servers 606(1)-606(N). In this particular instance, individual directory service modules are implemented on dedicated computers 608(1)-608(N), respectively. In other implementations, the directory service modules may be manifest on computers that perform other system functions. In this implementation, the number of directory service modules is generally modest relative to overall system size. For instance, one implementation can employ approximately 50-100 directory service modules for 100K servers (i.e., servers 316(1)-316(N) of FIG. 3). This range is provided for purposes of explanation and is not critical.

Directory service modules 604(1)-604(N) can be thought of as read-optimized, replicated directory servers that can cache AA-to-LA mappings. The directory service modules 604(1)-604(N) can communicate with agile agents 602(1)-602(N), and a small number (e.g., approximately 5-10 servers) of write-optimized, replicated state machine (RSM) servers 606(1)-606(N) that can offer a strongly consistent, reliable store of AA-to-LA mappings.

Directory service modules 604(1)-604(N) can ensure low latency, high throughput, and high availability for a high lookup rate. Meanwhile, the RSM servers 606(1)-606(N) can ensure strong consistency and durability, using, in at least some embodiments, a Paxos consensus algorithm or the like, for a modest rate of updates.

Individual directory service modules 604(1)-604(N) can cache AA-to-LA mappings stored at the RSM servers 606(1)-606(N) and can independently reply to lookups from agile agents 602(1)-602(N) using the cached state. Since strong consistency may not be a requirement, a directory service module can lazily synchronize its local mappings with the RSM server on a regular basis (e.g., every 30 seconds). To achieve high availability and low latency at the same time, an agile agent 602(1)-602(N) can send a lookup to a number k (e.g., two) of randomly-chosen directory service modules 604(1)-604(N). If multiple replies are received, the agile agent can simply choose the fastest reply and store it in its cache.

Directory service modules 604(1)-604(N) can also handle updates from network provisioning systems. For consistency and durability, an update can be sent to a single randomly-chosen directory service module and can be written through to the RSM servers 606(1)-606(N). Specifically, on an update, a directory service module can first forward the update to the RSM. The RSM reliably can replicate the update to individual RSM servers and then reply with an acknowledgment to the directory service module, which in turn can forward the acknowledgment back to the originating client.

As a potential optimization to enhance consistency, the directory service modules 604(1)-604(N) can optionally disseminate the acknowledged updates to a small number of other directory service modules. If the originating client does not receive an acknowledgment within a timeout (e.g., 2 seconds), the client can send the same update to another directory service module, thus trading response time for reliability and/or availability.

Other embodiments of the directory system are also possible. For example, a Distributed Hash Table (DHT) can be constructed using the directory servers, and AA/LA mappings stored as entries in the DHT. Other existing directory systems, such as Active Directory or the Lightweight Directory System, can also be used, although the performance may not be as good or the consistency as strong as with the embodiment described earlier.

Ensuring Eventual Consistency

Since AA-to-LA mappings can be cached at directory service modules and at agile agents' cache, an update can lead to inconsistency. To resolve inconsistencies without wasting server and network resources, a reactive cache-update mechanism can be employed to ensure both scalability and performance at the same time. The cache-update protocol can leverage a key observation: a stale host mapping needs to be corrected only when that mapping is used to deliver traffic. Specifically, when a stale mapping is used, some packets can arrive at a stale LA—a TOR or server that does not host the destination server anymore. The TOR or server can forward such non-deliverable packets to a directory service module, triggering the directory service module to selectively correct the stale mapping in the source server's cache, via unicast for example. In another embodiment of update, the directory service may multicast the update to all the server groups that are allowed to communicate with the affected server.

Further Implementations

Optimality of Load Balancing

As noted above, load balancing techniques such as VLB can use randomization to cope with volatility—potentially sacrificing some performance for a best-case traffic pattern by turning traffic patterns (including both best-case and worst-case) into an average case. This performance loss can manifest itself as utilization of some links being higher than they might be under a more optimal traffic engineering system. However, evaluations on actual data center workloads have shown that the simplicity and universality of load balancing techniques, such as VLB, can be associated with relatively little capacity loss when compared to more complex traffic engineering schemes.

Layout Configurations

Figure 7:
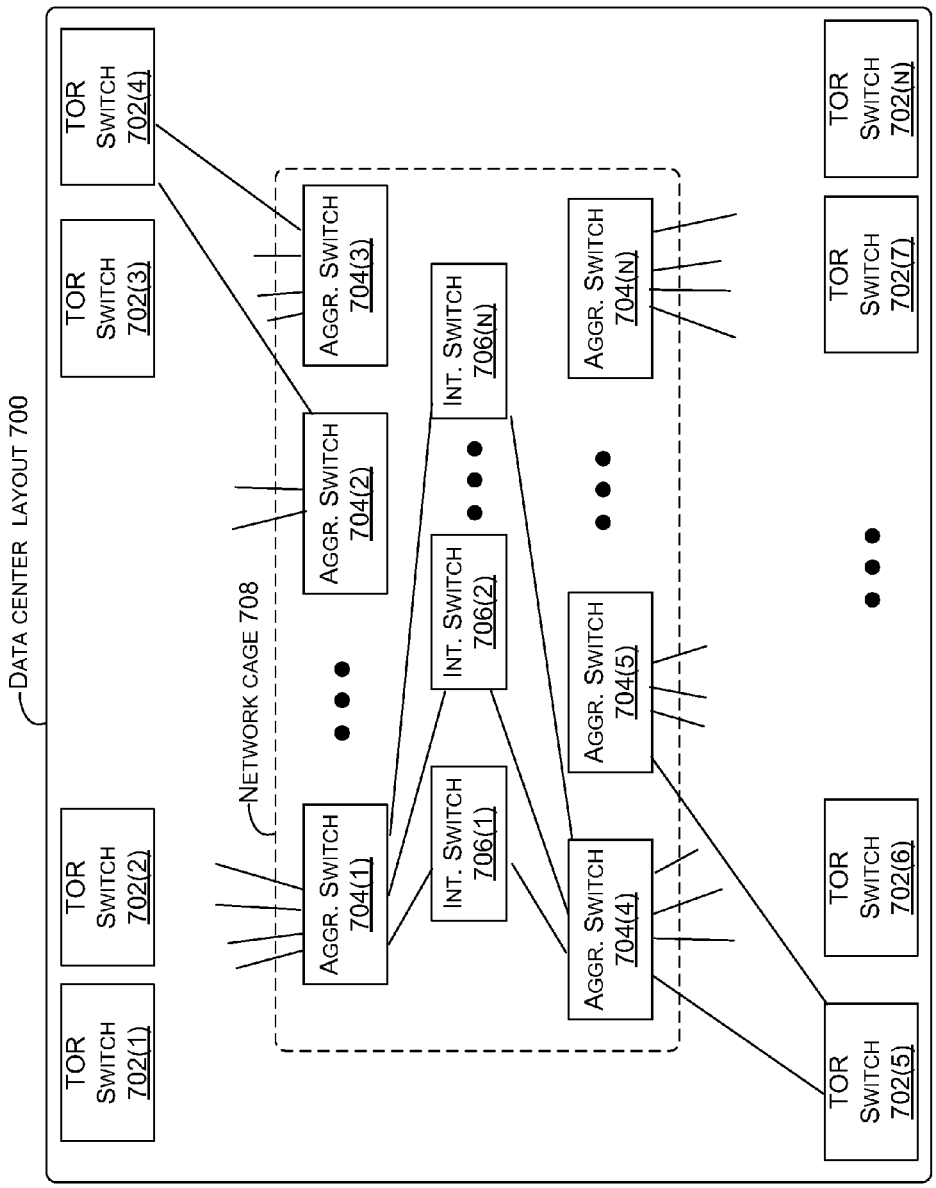
FIGS. 7-9 show examples of agile network data center layouts in accordance with some implementations of the present concepts.
Figure 8:
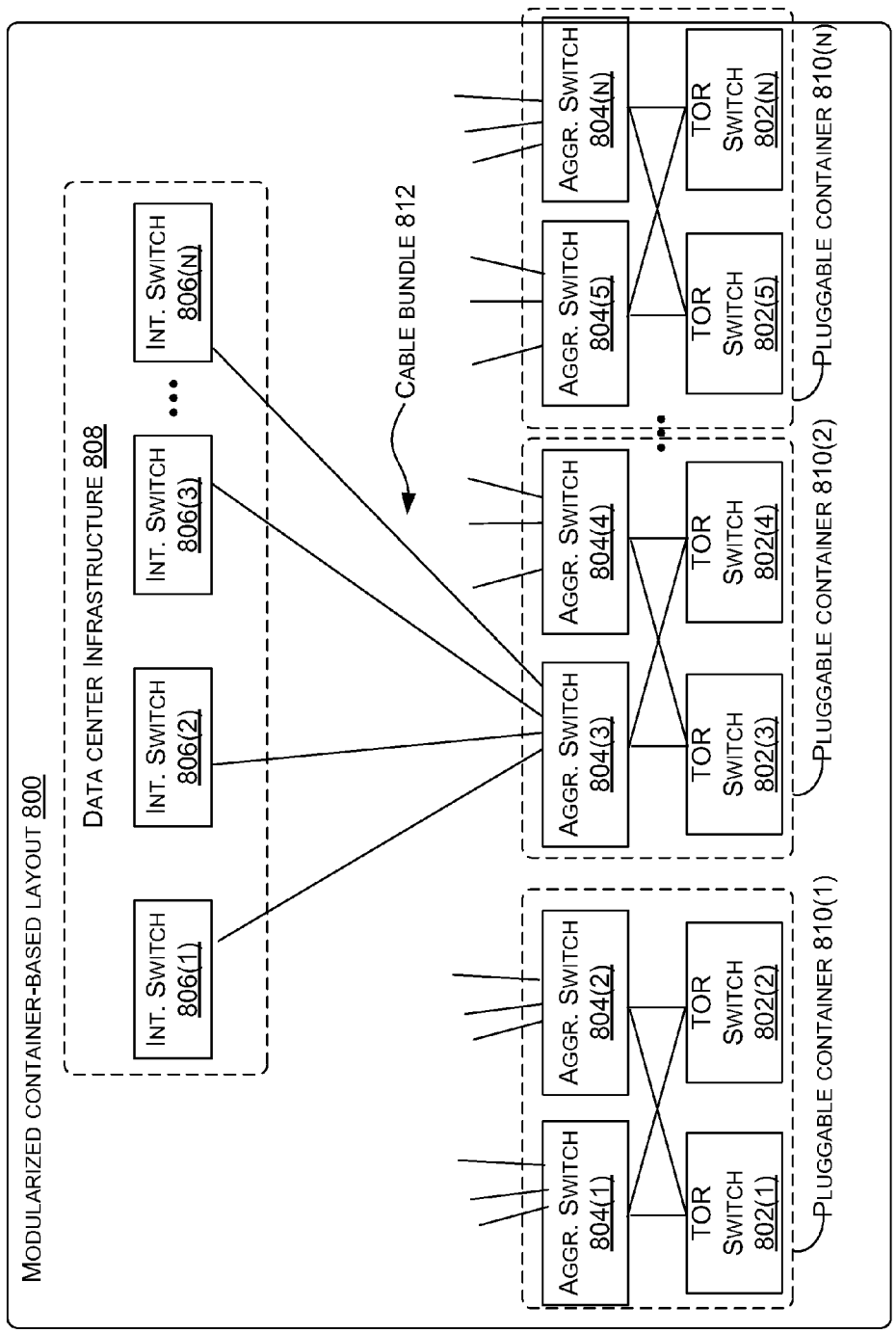
Figure 9:
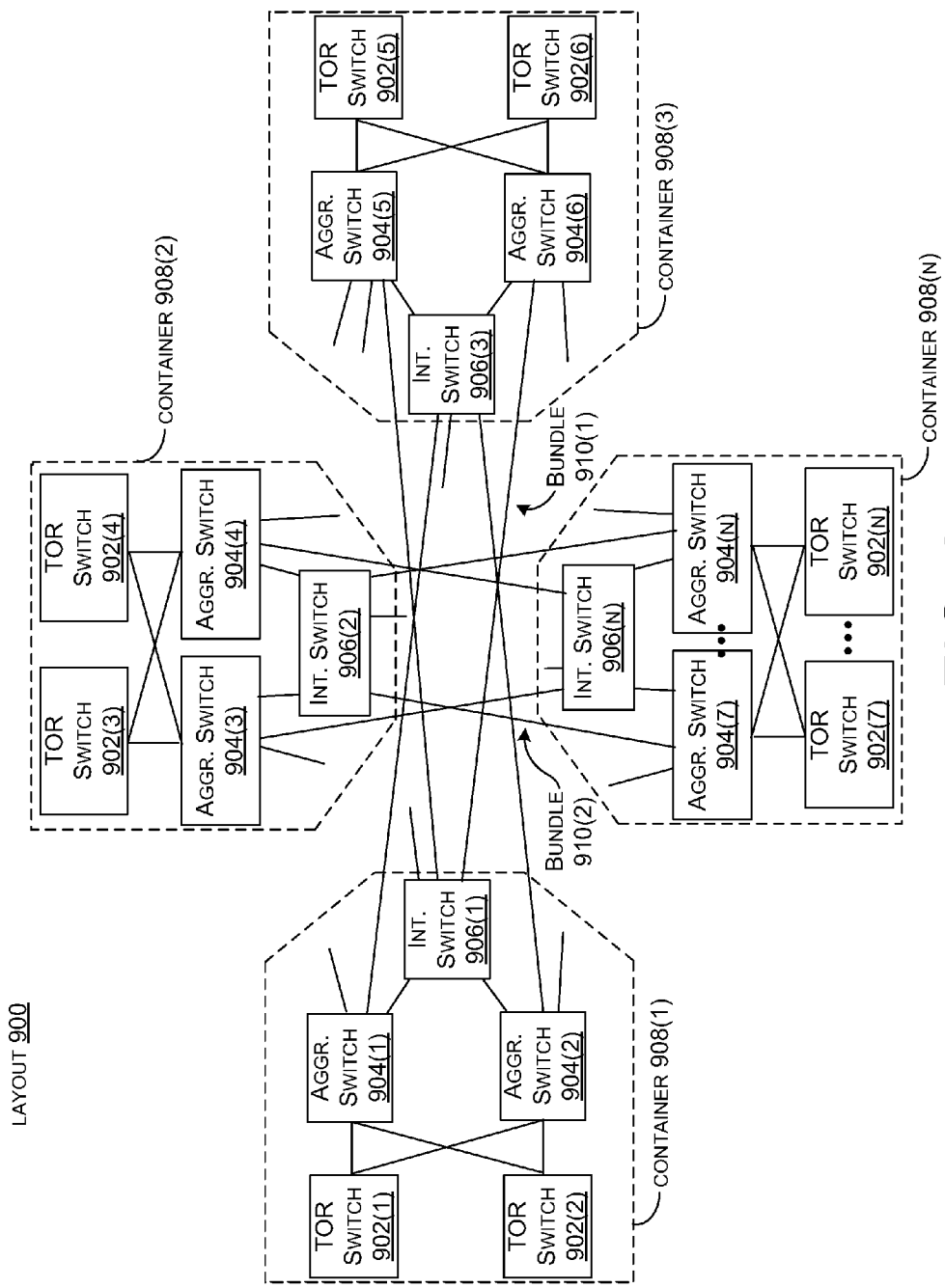

FIGS. 7-9 illustrate three possible layout configurations for a data center network implemented according to the described agile network architecture. In FIGS. 7-9, due to space constraints on the drawing page, TORS are shown without associated servers.

FIG. 7 illustrates an open floor plan data center layout 700. Data center layout 700 includes TOR's 702(1)-702(N), aggregation switches 704(1)-704(N), and intermediate switches 706(1)-706(N). In FIG. 7, TORS 702(1)-702(N) are shown as surrounding a central "network cage" 708 and can be connected (e.g., using copper and/or fiber cables, or the like). The aggregation and intermediate switches 704 (1)-704(N), 706(1)-706(N), respectively can be laid out in close proximity inside the network cage 708, allowing use of copper cables for their interconnection (copper cable can be lower cost, thicker, and have a low distance reach vs. fiber). The number of cables inside the network cage can be reduced (e.g., by a factor of 4) as well as their cost (e.g., by a factor of about 2) by bundling together a number (e.g., four) of 10G links into a single cable using an appropriate standard, such as the Quad Small Form Pluggable (QSFP) standard for example.

In open floor plan data center layout 700, intermediate switches 706(1)-706(N) are centrally arranged in the network cage 708 and the aggregation switches 704(1)-704(N) are interposed between the intermediate switches 706(1)-706(N) and the TOR switches 702(1)-702(N) (and associated servers).

Open floor plan data center layout 700 can be scalable as desired. For instance, additional server racks can be added by associating computing devices in the form of servers with a TOR 702(1)-702(N) to create a server rack. The server rack can then be connected to the aggregation switches 704(1)-704(N) of the network cage 708. Other server racks and/or individual servers can be removed without interrupting service provided by the open floor plan data center layout.

FIG. 8 illustrates a modularized container-based layout 800. Layout 800 includes TOR's 802(1)-802(N), aggregation switches 804(1)-804(N), and intermediate switches 806(1)-806(N). In this case, intermediate switches 806(1)-806(N) are included in the layout's data center infrastructure 808. Aggregation switches and TOR switches can be associated as pluggable containers that are connected to the data center infrastructure. For instance, aggregation switches 804(1) and 804(2) are associated with TOR switches 802(1) and 802(2) in pluggable container 810(1) which can be connected to data center infrastructure 808. Similarly, aggregation switches 804(3) and 804(4) are associated with TOR switches 802(3) and 802(4) in pluggable container 810(2) and aggregation switches 804(5) and 804(N) are associated with TOR switches 802(5) and 802(N) in pluggable container 810(N).

As with FIG. 7, in FIG. 8 the servers that would be associated with a TOR to make up a server rack are not shown due to space constraints of the drawing page. Further, due to space constraints, only two aggregation switches and two TOR switches are illustrated per pluggable container. Of course, other implementations can employ more or fewer of either or both of these components. Also, other implementations can employ more or fewer pluggable containers than the three shown here. One feature of interest is that layout 800 can lend itself to bringing one cable bundle 812 from each pluggable container 810(1)-810(N) to a data center spine (i.e., data center infrastructure 808). To summarize, data center infrastructure 808 can allow layout 800 to be expanded or contracted in size by adding or removing individual pluggable containers 810(1)-810(N).

FIG. 9 illustrates an "infrastructure-less" and "containerized" data center layout 900. The layout includes TOR's 902(1)-902(N), aggregation switches 904(1)-904(N), and intermediate switches 906(1)-906(N) arranged into multiple containers 908(1)-908(N). For instance, TOR's 902(1)-902 (2), aggregation switches 904(1)-904(2), and intermediate switch 906(1) are arranged into container 908(1).

The containers 908(1)-908(N) can allow realization of the "infrastructure-less" and "containerized" data center layout 900. This layout 900 may be associated with running a cable bundle 910(1) between individual pairs of containers 908(1) and 908(3). Another cable bundle 910(2) can run between individual pairs of containers 908(2) and 908(N). Individual cable bundles 910(1), 910(2) can carry links that connect the aggregation switches 904(1), 904(2) in container 908(1) to the intermediate switch 906(3) in container 908(3) and vice-versa.

To summarize, individual containers 908(1)-908(N) can include a plurality of switches. These switches can include TOR switches 902(1)-902(N), aggregation switches 904(1)-904(N) and intermediate switches 906(1)-906(N) that are arranged into complementary pluggable containers. Pairs of complementary pluggable containers can be coupled by connecting aggregation switches of a first pluggable container to intermediate switches of a second pluggable container and vice versa via a cable bundle. For instance, container 908(1) can be connected to container 908(3) via cable bundle 910(1). Specifically, the bundle can connect aggregation switches 904(1) and 904(2) of container 908(1) to intermediate switch 906(3) of container 908(3). Similarly, bundle 910(1) can connect aggregation switches 904(5) and 904(6) of container 908(3) to intermediate switch 906(1) of container 908(1).

In at least some implementations, the agile network architecture can consist of the following components: (1) a set of switches connected together into a topology; (2) a set of servers, each connected to one or more of the switches; (3) a directory system to which requests are made when a server wishes to send packet(s) to another server and which responds with information that the server (or the server's representative agile agent) uses in addressing or encapsulating the packets it wishes to send so that they will be able to traverse the topology of switches; (4) a mechanism for controlling congestion in the network that reduces/prevents utilization on any link from growing so high that packets are dropped by the switch(es) that send into that link; and (5) a module on the servers that communicates with the directory service; encapsulates, addresses or decapsulates packets as needed; and participates in congestion control as needed.

In at least one embodiment, there can be an agile agent on each server that provides functions such as: (1) communication with the agile directory service to retrieve the encapsulation information utilized to forward packets to destinations, register this server into the system, etc.; (2) make random selections among sets of alternatives as needed (e.g., among intermediate switches) and cache these selections; (3) encapsulate/de-capsulate packets; and (4) detect and respond to congestion indications from the network. Alternatively, in at least some embodiments, these functions may be distributed between the servers and the switches in the network. For example, default routing could be used to direct packets to a set of switches (such as the intermediate switches), and the functionalities listed above implemented for each packet on the intermediate switch that the packet traverses.

In at least some embodiments, implementing the agile network architecture described herein can include creating a network among a set of the switches in the data center so that each switch in the network is capable of sending packets to any other switch in the network. It is not necessary for these switches or this network to use the same type of address for directing packets among themselves as the addresses used by servers to communicate with other servers. For example, MAC addresses, IPv4 addresses, and/or IPv6 addresses may all be suitable.

In at least one embodiment of the agile network, one consideration among a set of switches in the data center is to configure each of them with IP addresses, either IPv4 or IPv6, and configure them to run one or more standard layer-3 routing protocols, with typical examples being Open-Shortest Path First (OSPF), Intermediate System-Intermediate System (IS-IS) or the Border Gateway Protocol (BGP). A benefit of such an embodiment is that the coupling between the network and the directory system is reduced, with the control plane of the network created by its routing protocols maintaining the ability of the network to forward packets between switches such that the directory system does not have to react to and notify servers of most changes to the topology.

Alternatively or additionally, the directory system can monitor the topology of the network (e.g., monitoring the health of the switches and links) and change the encapsulation information it provides to servers as the topology changes. The directory system might also notify servers to which it had previously sent responses, that those responses are no longer valid. A potential benefit of the first embodiment over the alternative is that the coupling between the network and the directory system is reduced, with the control plane of the network created by its routing protocols maintaining the ability of the network to forward packets between switches, such that the directory system does not have to react to and notify servers of most changes to the topology. In summary, packet delivery delays can be reduced or avoided by monitoring one or more parameters related to network performance. The parameters can be indicative of network events, such as communication impairment over a particular path.

In one embodiment, the switches of the network are configured with IPv4 addresses drawn from a subnet of LA addresses. The switches are configured to run the OSPF routing protocol. The addresses of the switches are distributed among the switches by the OSPF protocol. The unnumbered interface extensions to OSPF may be used to reduce the amount of information distributed by the OSPF protocol. The server-facing ports of each Top Of Rack (TOR) switch are configured on the switch to be part of a Virtual Local Area Network (VLAN). The subnet(s) that comprise the AA space are configured on the switch as assigned to the server-facing VLAN. The addresses of this VLAN are not distributed into OSPF, and the VLAN is typically not trunked. Packets destined to a server are encapsulated to the TOR to which the server is connected. This TOR will decapsulate the packets as it receives them, and then forward them onto the server-facing VLAN based on the destination address of the server. The server will then receive the packets as in a normal LAN.

In another embodiment, instead of configuring the AA subnet(s) onto the server-facing VLAN of the TOR switches, an LA subnet unique to each TOR is assigned to the server-facing VLAN. This LA subnet is distributed by OSPF. Servers connected to the TOR are configured with at least two addresses. An LA address drawn from the LA subnet is assigned to the server-facing VLAN of which it is a part, and an AA address. Packets destined to a server are encapsulated to the LA which has been configured onto the server. The module on the server can decapsulate the packets as it receives them, and deliver them locally to the Virtual Machine or process on the server to which they are destined based on the AA address contained in the packet.

In another embodiment, the TOR switches may operate as layer-2 switches while the aggregation layer switches may operate as layer-3. This design may enable potentially cheaper layer-2 switches to be used as the TOR switch (and there are many TOR switches) while the layer-3 functionality can be implemented in the relatively fewer number of aggregation layer switches. In this design, the decapsulation functionality can be performed at the layer-2 switch, the layer-3 switch, the destination server, or the destination virtual machine.

In any embodiment, additional addresses may be configured onto switches or distributed via a routing protocol, such as OSPF. These addresses will typically be topologically significant (that is, LAs). The addresses will typically be used to direct packets to infrastructure services—that is, servers, switches, or network devices that provide what are known as additional services. Examples of such services include load balancers (these may be hardware based like the BigIP from F5 or software-based load-balancers), Source Network Address Translators (S-NATs), servers that are part of the directory system, servers that offer DHCP services, or gateways to other networks (such as the Internet or other data centers).

In one embodiment, each switch can be configured as a route reflector client using the BGP protocol. Additional addresses are distributed to the switches by configuring them on the route reflector(s) and allowing BGP to distribute them to the switches. This embodiment has the benefit that adding or removing an additional address does not cause an OSPF recomputation that could overload the switches' routing processors.

In another embodiment, the mechanism for controlling congestion in the network is implemented on the servers themselves. A suitable mechanism is one like the Transport Control Protocol (TCP), where the traffic sent by the server to a destination is limited by the server to a rate the network appears able to carry. Improvements to the use of protocols like TCP will be described next. In an alternative embodiment, Quality of Service mechanisms on the switches can be used for congestion control. Examples of such mechanisms include weighted fair queuing (WFQ) and its derivatives, Random Early Detection (RED), RSVP, eXplicit Control Protocol (XCP), and Rate Control Protocol (RCP).

In at least one embodiment, the module on the servers observes the packets being received from the agile network and alters the sending of packets or the packets' encapsulation based on the information it obtains or infers from the received packets. The agile agent can reduce the congestion in the network by (1) altering the sending of packets to reduce the rate at which they are sent, or (2) altering the packets' encapsulation so that they take a different path through the network, which can be achieved by remaking any or all of the random choices among possible alternatives it made when first choosing the encapsulation and addressing of the packet(s).

Examples of the observations the agile agent can make and its reaction include: (1) If the agile agent detects the loss of a full window of TCP packets, the agile agent re-randomizes the path the packets will take through the network. This is particularly beneficial as it places the flow onto a different (hopefully non-congested) path at the same time as all packets previously sent on the flow are believed to have exited from the network so that changing the path taken by the packets will not cause reordered packets to be received by the destination. (2) The agile agent can periodically re-randomize the path taken by the packets. (3) The agile agent can compute the effective rate being achieved by a flow, and re-randomize if the rate is below an expected threshold. (4) The agile agent can watch received packets for Explicit Congestion Notification (ECN) marks and reduce the rate or re-randomize the path of any packets to that destination. (5) Switches can execute logic to detect links that have entered or are about to enter a congested state (e.g., as in IEEE QCN and 802.1au) and send notifications to upstream switches and/or servers. Agile agents receiving these indications can reduce the rate of their packets or re-randomize the paths of the packets.

One advantage of the described embodiments is that they allow the live migration of virtual machines (VMs), since a VM can be relocated from one server to another while retaining use of the same IP address. The directory system can simply be updated to direct packets destined to the VM's IP address to the server on to which the VM is relocated during the move. The physical change in location need not disturb ongoing communication.

In at least one embodiment, a fraction of the capacity of the network can be reserved or preferentially allocated to a set of services operating over the network by non-uniform computation of split ratios, such that preferred services have their packets spread over a larger or smaller number of paths, or a set of paths disjoint from the paths used by another set of services. Multiple classes of preference or QoS can be created using this same technique.

Method Example

Figure 10:
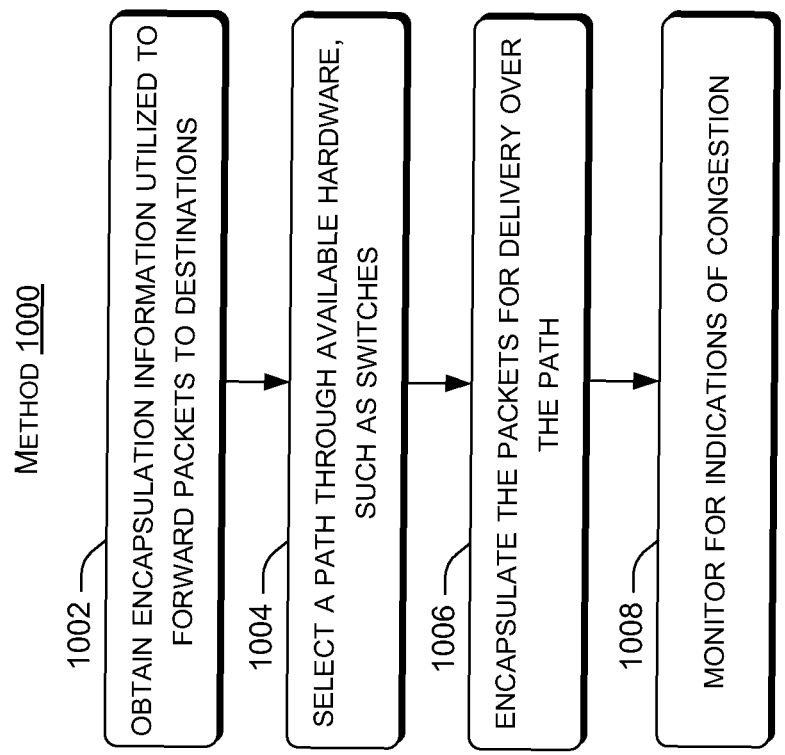
FIG. 10 is a flowchart of an agile network method that can be accomplished in accordance with some implementations of the present concepts.

FIG. 10 shows a flowchart of an agile networking technique or method 1000 that is consistent with at least some implementations of the present concepts. The order in which the method 1000 is described is not intended to be construed as a limitation, and any number of the described blocks can be combined in any order to implement the method, or an alternative method. Furthermore, the method can be implemented in any suitable hardware, software, firmware, or any combination thereof, such that a computing device can implement the method. In one case, the method is stored on a computer-readable storage media as a set of instructions such that execution by a processor of a computing device causes the computing device to perform the method. In another case, the method is stored on a computer-readable storage media of ASIC for execution by the ASIC.

At 1002, the method obtains encapsulation information utilized to forward packets to destinations.

At block 1004, the method selects a path through available hardware, such as switches.

At block 1006, the method encapsulates the packets for delivery over the path.

At block 1008, the method monitors for indications of congestion. For instance, the method can monitor parameters related to network performance. For example, TCP can provide updates related to packet transmission rates and/or loads on network components that can act as network parameters that relate to congestion. The method can reselect the path and/or take other actions when congestion is detected.

The invention claimed is:

1. A method of providing a virtual layer-2 network over a layer-3 infrastructure connecting a plurality of machines including a first machine and a second machine by assigning application addresses to individual machines of the plurality of machines and location addresses to components of the layer-3 infrastructure, the method comprising:
    intercepting, by an agile agent associated with the first machine, a virtual layer-2 packet with an assigned application address of a destination server associated with the second machine, wherein individual machines of the plurality of machines are associated with different agile agents;
    determining, by the agile agent associated with the first machine, that the destination server is in a defined server group for a service, the defined server group being stored in an agile directory service;
    based on the destination server being in the defined server group, utilizing, by the agile agent, the agile directory service to retrieve an individual location address associated with the application address;
    selecting, by the agile agent, a switch of the layer-3 infrastructure through which to send the virtual layer-2 packet to the individual location address, the switch being selected from a plurality of switches of the layer-3 infrastructure to provide load balancing;
    encapsulating, by the agile agent, the virtual layer-2 packet in a layer-3 packet, wherein the layer-3 packet is assigned the individual location address of the switch of the layer-3 infrastructure; and
    transmitting the layer-3 packet to the switch, wherein the switch is configured to decapsulate the encapsulated virtual layer-2 packet and transmit the decapsulated virtual layer-2 packet to the second machine over a physical network connection,
    wherein, where the destination server is not in the defined server group, the agile directory service refuses to provide the individual location address.

2. The method of claim 1, further comprising using early turnaround paths between the individual machines of the plurality of machines.

3. The method of claim 1, wherein the agile agent comprises a combination of hardware located within layer-2 infrastructure associated with the first machine and software that executes in the layer-2 infrastructure associated with the first machine.

4. The method of claim 1, wherein the providing the virtual layer-2 network comprises providing multiple virtual layer-2 networks.

5. The method of claim 1, wherein the agile agent is located on a source server associated with the first machine or on a Top of Rack (ToR) switch associated with the first machine, wherein the ToR switch is not the switch.

6. The method of claim 1, wherein the selecting the switch further comprises randomly selecting an individual path of the layer-3 infrastructure between the first and second machines.

7. The method of claim 6, further comprising utilizing valiant load balancing to select the individual path.

8. The method of claim 6, further comprising:
monitoring, by the agile agent, at least one network performance parameter; and
reselecting the individual path responsive to a based upon values of the at least one network performance parameter.

9. A system, comprising:
a plurality of computing devices communicatively coupled via a physical network connection including a plurality of switches, individual computing devices associated with an application address;
an agile agent associated with a source computing device of the plurality of computing devices, the agile agent configured to:
intercept a packet with an assigned application address of a destination computing device of the plurality of computing devices,
determine whether the destination computing device is in a defined communication group of the source computing device, the defined communication group being stored in an agile directory service,
where the destination computing device is in the defined communication group, retrieve a location address of an individual switch associated with the assigned application address using the agile directory service,
select a different individual switch of the plurality of switches through which to send the packet to the location address, the different individual switch being selected to provide load balancing,
encapsulate the packet and assign the encapsulated packet the location address of the individual switch, and
transmit the encapsulated packet to the individual switch via the different individual switch, wherein upon receipt of the encapsulated packet the individual switch is configured to decapsulate the packet and transmit the decapsulated packet to the application address of the destination computing device over a physical network connection,
wherein, where the destination computing device is not in the defined communication group, the agile directory service refuses to provide the location address.

10. The system of claim 9, wherein the individual switch associated with the assigned application address is a Top of Rack (ToR) switch.

11. The system of claim 9, wherein the agile agent comprises a plurality of agile agents and wherein sub-sets of the agile agents and the plurality of computing devices are organized into a server rack and further comprising a network cage configured to be communicatively coupled to multiple server racks.

12. The system of claim 9, wherein the plurality of switches comprise intermediate switches and aggregation switches that are arranged in a pluggable container with at least some of the plurality of computing devices.

13. The system of claim 9, wherein the plurality of switches comprises a layer-3 infrastructure and encapsulating the packet further comprises encapsulating a virtual layer-2 packet with a layer-3 packet for transmission over the layer-3 infrastructure.

14. The system of claim 9, further comprising the agile directory service, wherein the agile directory service is configured to assign sub-sets of the plurality of switches to individual groups of computing devices.

15. The system of claim 9, further comprising the agile directory service, wherein the agile directory service is configured to assign specific application addresses and specific location addresses to individual customers and to specify which application addresses are allowed to communicate with one another.

16. The system of claim 9, further comprising the agile directory service, wherein the agile directory service is configured to map paths between the source computing device and the destination computing device via individual switches using anycast addresses or valiant load balancing.

17. The system of claim 9, wherein the agile agent comprises hardware located on a forwarding path of the packet, the hardware configured to intercept the packet, the forwarding path being located between the source computing device and the destination computing device, and the agile agent further comprises software instructions that execute in the forwarding path to cause the interception of the packet.

18. The system of claim 17, wherein the plurality of switches are further along the forwarding path toward the destination computing device than the agile agent, and the plurality of switches are aware of the location address but are not aware of the application address.

19. A server, comprising:
at least one processor for executing computer readable instructions; and,
an agile agent that is executable by the at least one processor and configured to:
receive a packet for delivery to another server with an application address,
access an agile directory service to determine whether a defined server group of the server includes the another server, the defined server group being stored in the agile directory service, and
in a case where the defined server group includes the another server, utilize the agile directory service to retrieve a location address of a switch associated with the another server, encapsulate the packet for the delivery over a physical network connection via an intermediate switch selected from a plurality of intermediate switches to provide load balancing, wherein the encapsulated packet is assigned the location address to the switch associated with the another server, and wherein upon receiving the encapsulated packet the switch associated with the another server is configured to decapsulate the encapsulated packet and transmit the decapsulated packet to the another server with the application address over a physical network connection,
wherein, in cases where the defined server group does not include the another server, the agile directory service denies the location address.

20. The server of claim 19, wherein the agile agent is further configured to provide path control associated with the load balancing.

21. The server of claim 19, wherein the defined server group is stored by the agile directory service.

22. The server of claim 19, wherein the agile directory service stores a mapping of the application address to the location address.

\* \* \* \* \*